US012744350B2

(12) United States Patent
Gieski

(10) Patent No.: US 12,744,350 B2
(45) Date of Patent: Sep. 22, 2026

(54) ELECTRICAL CONNECTOR FOR HIGH POWER COMPUTING SYSTEM

(71) Applicant: FCI USA LLC, Etters, PA (US)

(72) Inventor: Christopher S. Gieski, Dillsburg, PA (US)

(73) Assignee: FCI USA LLC, Etters, PA (US)

( * ) Notice: Subject to any disclaimer, the term of this patent is extended or adjusted under 35 U.S.C. 154(b) by 396 days.

(21) Appl. No.: 17/991,751

(22) Filed: Nov. 21, 2022

(65) Prior Publication Data

US 2023/0163528 A1 May 25, 2023

Related U.S. Application Data

(60) Provisional application No. 63/417,973, filed on Oct. 20, 2022, provisional application No. 63/283,124, filed on Nov. 24, 2021.

(51) Int. Cl.

| | |
|---|---|
| ***H01R 13/64*** | (2006.01) |
| ***H01R 12/70*** | (2011.01) |
| ***H01R 13/05*** | (2006.01) |

(52) U.S. Cl.

CPC ......... *H01R 13/64* (2013.01); *H01R 12/7005* (2013.01); *H01R 13/052* (2013.01)

(58) Field of Classification Search

CPC ... H01R 12/7005; H01R 13/64; H01R 13/052

(Continued)

(56) References Cited

U.S. PATENT DOCUMENTS

| | | |
|---|---|---|
| 5,030,108 A | 7/1991 | Babow et al. |
| 5,221,218 A | 6/1993 | Marach |

(Continued)

FOREIGN PATENT DOCUMENTS

| | | |
|---|---|---|
| CN | 2490737 Y | 5/2002 |
| CN | 101082825 A | 12/2007 |

(Continued)

OTHER PUBLICATIONS

International Search Report and Written Opinion mailed Sep. 16, 2020 in connection with International Application No. PCT/CN2019/124770.

(Continued)

*Primary Examiner* — Gary F Paumen

(74) *Attorney, Agent, or Firm* — Wolf, Greenfield & Sacks, P.C.

(57) ABSTRACT

A connector that enables electronic assemblies to be efficiently configured for any of multiple power requirements. The connector may have a mating interface, which may mate with a power supply, a mounting interface for attaching the connector to a PCB and a power tap off interface. The power tap off interface enables distribution of a portion of the power received through the mating interface to remote locations on the PCB. Terminals with portions at each of the mating interface, mounting interface and power tap off interface may be formed from subassemblies, with conductors of one terminal subassembly engaging conductors of another subassembly. One subassembly may have conductors with mating contact portions at one end and a body portion with holes at the other end. Another subassembly may have conductors with tails passing through and engaging the holes in the body portion of the other.

29 Claims, 15 Drawing Sheets

(58) Field of Classification Search
USPC .................................................... 439/59, 65
See application file for complete search history.

(56) References Cited

U.S. PATENT DOCUMENTS

| | | | | |
|---|---|---|---|---|
| 5,797,757 | A | 8/1998 | Aoki | |
| 6,024,589 | A | 2/2000 | Hahn, IV et al. | |
| 6,036,508 | A | 3/2000 | Anderson et al. | |
| 6,402,542 | B1 * | 6/2002 | Jones | H01R 12/87 439/907 |
| 6,780,018 | B1 | 8/2004 | Shipe | |
| 6,780,027 | B2 | 8/2004 | Allison | |
| 6,848,948 | B1 | 2/2005 | Khemakhem et al. | |
| 6,848,950 | B2 | 2/2005 | Allison et al. | |
| 6,994,598 | B2 | 2/2006 | Holmes et al. | |
| 7,704,079 | B2 | 4/2010 | Weiss et al. | |
| 7,753,737 | B2 * | 7/2010 | Yang | H01R 13/6315 439/79 |
| 7,848,115 | B2 | 12/2010 | Casto et al. | |
| 7,976,317 | B2 | 7/2011 | Patel et al. | |
| 8,038,451 | B2 | 10/2011 | Peterson et al. | |
| 8,045,340 | B2 | 10/2011 | Heinrichs et al. | |
| 8,057,266 | B1 | 11/2011 | Roitberg | |
| 8,435,047 | B2 | 5/2013 | Patel et al. | |
| 8,573,983 | B2 | 11/2013 | Zieder | |
| 8,610,316 | B2 | 12/2013 | Spitaels et al. | |
| 8,690,589 | B2 | 4/2014 | Ngo | |
| 8,979,562 | B2 | 3/2015 | Crighton et al. | |
| 9,478,885 | B2 | 10/2016 | MacDougall | |
| 9,559,446 | B1 | 1/2017 | Wetzel et al. | |
| 9,691,580 | B2 | 6/2017 | von zur Muehlen | |
| 10,014,601 | B1 | 7/2018 | Nakazawa | |
| 10,020,603 | B1 | 7/2018 | Liu et al. | |
| 10,096,920 | B2 | 10/2018 | Lee | |
| 10,170,868 | B1 | 1/2019 | Oyake et al. | |
| 10,522,945 | B2 | 12/2019 | Schneider et al. | |
| 10,581,196 | B2 | 3/2020 | Liu et al. | |
| 10,784,631 | B2 | 9/2020 | Brungard et al. | |
| 10,980,117 | B1 | 4/2021 | Maas et al. | |
| 11,102,902 | B2 | 8/2021 | Nelson et al. | |
| 11,539,154 | B2 | 12/2022 | Horning et al. | |
| 12,176,637 | B2 * | 12/2024 | Gieski | H01R 12/7064 |
| 12,401,146 | B2 | 8/2025 | Gieski et al. | |
| 2006/0223385 | A1 | 10/2006 | Pavlovic et al. | |
| 2007/0184688 | A1 * | 8/2007 | Avitia | H05K 3/4046 439/82 |
| 2007/0293084 | A1 | 12/2007 | Ngo | |
| 2009/0111328 | A1 | 4/2009 | Yang et al. | |
| 2009/0246990 | A1 | 10/2009 | Yang et al. | |
| 2010/0167593 | A1 | 7/2010 | Yu | |
| 2012/0190219 | A1 | 7/2012 | Pai et al. | |
| 2014/0051269 | A1 | 2/2014 | Chang et al. | |
| 2015/0282319 | A1 | 10/2015 | Salzman et al. | |
| 2016/0013570 | A1 | 1/2016 | Fry, Jr. et al. | |
| 2016/0093963 | A1 | 3/2016 | Streckewald | |
| 2016/0338191 | A1 | 11/2016 | Tanaka et al. | |
| 2017/0003010 | A1 | 1/2017 | Mostoller et al. | |
| 2019/0288450 | A1 | 9/2019 | Brungard | |
| 2019/0288466 | A1 | 9/2019 | Copper et al. | |
| 2019/0296507 | A1 | 9/2019 | Fukami et al. | |
| 2022/0224034 | A1 | 7/2022 | Do et al. | |
| 2022/0255250 | A1 | 8/2022 | Gieski et al. | |
| 2022/0329014 | A1 | 10/2022 | Zi et al. | |
| 2023/0006379 | A1 | 1/2023 | Gieski et al. | |
| 2025/0174920 | A1 | 5/2025 | Gieski et al. | |

FOREIGN PATENT DOCUMENTS

| | | | |
|---|---|---|---|
| CN | 102282728 | A | 12/2011 |
| CN | 202384604 | U | 8/2012 |
| CN | 1774835 | B | 6/2013 |
| CN | 204668508 | U | 9/2015 |
| CN | 207853027 | U | 9/2018 |
| CN | 109787004 | A | 5/2019 |
| DE | 102016218018 | A1 | 3/2018 |
| EP | 3477776 | A1 | 5/2019 |
| GB | 2342789 | A | 4/2000 |
| TW | M449366 | U | 3/2013 |
| TW | M454002 | U | 5/2013 |
| TW | M472351 | U | 2/2014 |
| TW | M556420 | U | 3/2018 |
| TW | 201817089 | A | 5/2018 |
| WO | WO 2015/112773 | A1 | 7/2015 |

OTHER PUBLICATIONS

International Search Report and Written Opinion mailed May 20, 2022 in connection with International Application No. PCT/US2022/015609.

International Preliminary Report on Patentability mailed Jun. 23, 2022 in connection with International Application No. PCT/CN2019/124770.

Extended European Search Report dated Jun. 26, 2023 in connection with European Application No. 22209396.5.

EP 22209396.5, Jun. 26, 2023, Extended European Search Report.

Taiwanese Office Action dated Jun. 10, 2026 in connection with Taiwanese Application No. 111144855.

* cited by examiner

ELECTRICAL CONNECTOR FOR HIGH POWER COMPUTING SYSTEM

CROSS-REFERENCE TO RELATED APPLICATIONS

This application claims priority to and the benefit under 35 U.S.C. § 119(e) of U.S. Provisional Application Ser. No. 63/417,973, filed on Oct. 20, 2022, entitled "ELECTRICAL CONNECTOR FOR HIGH POWER COMPUTING SYSTEM." This application also claims priority to and the benefit under 35 U.S.C. § 119(e) of U.S. Provisional Application Ser. No. 63/283,124, filed on Nov. 24, 2021, entitled "ELECTRICAL CONNECTOR FOR HIGH POWER COMPUTING SYSTEM." The contents of these applications are incorporated herein by reference in their entirety.

FIELD OF THE DISCLOSURE

The technology disclosed herein relates to electrical interconnection systems, for example, electrical interconnection systems for supplying electrical power in a computing system that draws a high current.

BACKGROUND

Electrical connectors are used in many electrical systems. Electronic devices have been provided with assorted types of connectors whose primary purpose is to enable data, commands, power and/or other signals to pass between electronic assemblies. It is generally easier and more cost effective to manufacture an electrical system as separate electronic assemblies that may be joined with electrical connectors. The electrical connectors may transfer power between electronic assemblies via one or more electrical contacts, which may make up a part of the electrical connector. For example, one type of electronic assembly is a printed circuit board ("PCB"). The terms "card" and "PCB" may be used interchangeably herein.

In some scenarios, a two-piece connector is used to join two assemblies. One connector may be mounted to each of the assemblies. The connectors may be mated, forming connections between the two assemblies.

In other scenarios, a PCB may be joined directly to another electronic assembly via a one-piece connector, which may be configured as a card edge connector. The PCB may have pads along an edge that is designed to be inserted into an electrical connector attached to another assembly. Contacts within the electrical connector may contact the pads, thus connecting the PCB to the other assembly through the connector.

In some scenarios, busbars may be routed through an electronic device to distribute power to electronic assemblies within the device. The electronic assemblies may be connected to the busbar through connectors or screws.

SUMMARY

In one aspect the present disclosure relates to a power connector comprising a terminal. The terminal may comprise a first conductor comprising one or more tails and a second conductor comprising one or more openings. A cross sectional shape of the one or more tails and a shape of the one or more openings may be different. The one or more tails may pass through and engage the one or more openings such that the first and second conductors are electrically coupled.

In another aspect, a power connector may comprise a housing comprising a first slot, a second slot and a mounting face. A terminal may comprise a first mating portion in the first slot, a second mating portion in the second slot and one or more tails extending through the mounting face. The terminal may comprise a first conductor comprising the one or more tails and a mating contact portion positioned in the first slot, and a second conductor comprising a mating contact portion positioned in the second slot and one or more openings. Each of the one or more tails may pass through and electrically engage a respective opening of the one or more openings such that the first conductor and the second conductor are electrically connected.

In another aspect, an electrical connector may comprise a mating interface, a power tap off interface and a mounting interface. The electrical connector may comprise a plurality of terminals. Each of the plurality of terminals may comprise a first terminal subassembly comprising a plurality of first conductive members, each of the plurality of first conductive members comprising a mating interface portion disposed at the power tap off interface and tails configured for mounting to a substrate disposed at the mounting interface. Each of the plurality of terminals may further comprise a second terminal subassembly comprising a plurality of second conductive members, each of the plurality of second conductive members comprising a mating interface portion at the mating interface and a body portion comprising a plurality of holes. The tails of the plurality of first members may pass through respective holes of the plurality of second members, making an electrical connection between the plurality of first conductive members and the plurality of second conductive members.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

Various aspects and embodiments of the present technology disclosed herein are described below with reference to the accompanying figures. It should be appreciated that the figures are not necessarily drawn to scale. Items appearing in multiple figures may be indicated by the same reference numeral. For the purposes of clarity, not every component may be labeled in every figure.

DETAILED DESCRIPTION

Figure 1:
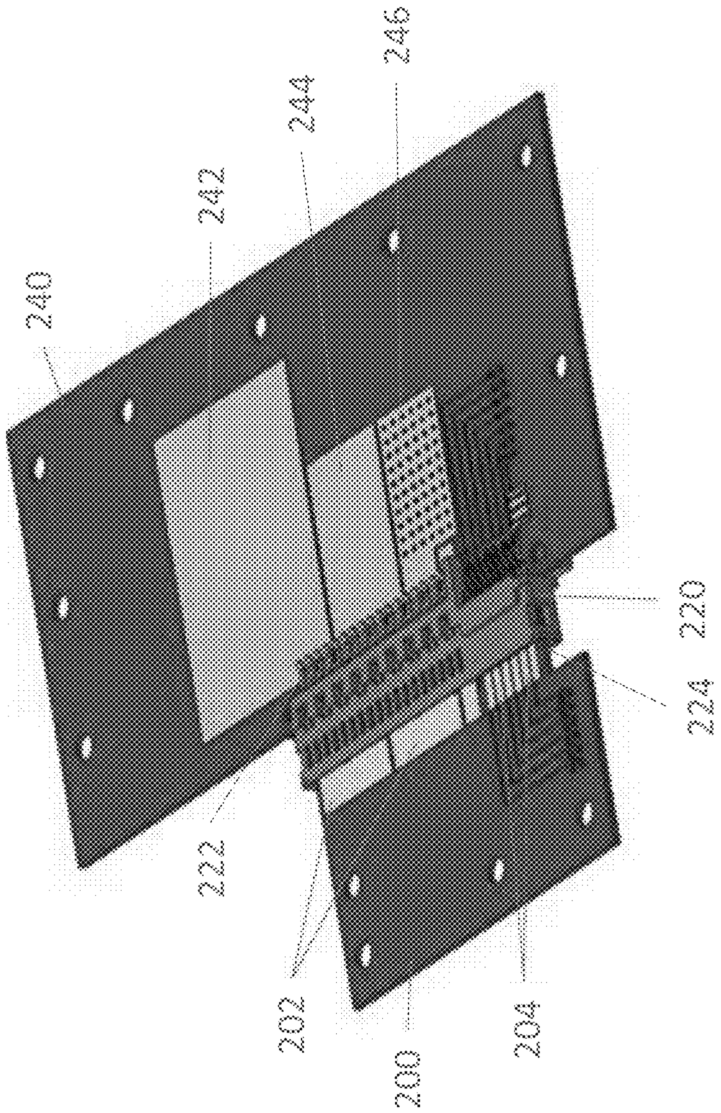
FIG. 1 is a simplified perspective view of two parallel boards connected through a straddle-mount card edge connector, according to one illustrative embodiment.

The inventors have recognized and appreciated compact and reliable designs for connectors that support high speed, high performance electronic assemblies with low life-cycle costs. Such assemblies may be implemented with a substrate (e.g., a printed circuit board (PCB)) to which is mounted a first connector with power tap off. The connector with power tap off may have at least two mating interfaces. One mating interface may be configured to connect to a power supply. The other mating interface may be configured to receive a conductive interconnect, such as a busbar or a cable, that can distribute power to locations in the assembly remote from where the first connector is mounted to the substrate. Without the conductive interconnect in place, current supplied through the first mating interface of the first connector may be distributed to components of the electronic assembly through the substrate (e.g., through the power planes of a PCB).

With the conductive interconnect in place, a portion of the supplied current may flow through the interconnect to components of the electronic assembly remote from the first connector without flowing through the substrate in the vicinity of the connector. In this way, the current density within the substrate in the vicinity of the first connector is decreased relative to a configuration in which the interconnect is not installed. Alternatively or additionally, the total current supplied to the electronic assembly may be increased without increasing the current density within the substrate in the vicinity of the first connector.

An increase in current may be desired, for example, during the life of an electronic assembly when it is upgraded with additional or more powerful components, which draw more power. These components may be added in the field or may be included in newly manufactured devices using a substrate designed prior to the upgrade. The capability to add the interconnect and increase the total current without increasing current density enables the substrate to be designed with a capability to carry less than the total amount of power that every copy of such a substrate might ever have to carry over its lifetime. Because increasing the current carrying capacity of a substrate, such as a PCB, conventionally entails adding more layers to the PCB, enabling a PCB to be designed for less than the total current it might carry, a PCB may be designed to be thinner and to have a lower manufacturing cost than a conventional PCB of the same capabilities.

The Inventors have recognized and appreciated approaches for economically manufacturing conductive elements with mating contacts suitable for use in connectors with multiple mating interfaces. Such designs may support relatively low profile connectors, in which the height of the connector with a power tap off extends a relatively short distance from the substrate to which the connector is mounted. These designs may also support cost-effective and reliable manufacture of connectors for power tap off.

In some embodiments, a terminal for a connector with power tap off may be assembled from a first conductor and a second conductor. The first conductor may have tails, such as may be used for mounting to a printed circuit board. The second conductor may have openings. The openings and cross sectional shape of a tail in a plane of the openings may be different such that, where the tails pass through the openings, they engage to form an electrical connection. The tails and openings may form an interference fit. The openings may be circular, for example, and the tails may have a rectangular cross section, such as a square. Each of the first and second conductors may have mating contact portions, which may form, respectively, a part of a power tap off interface or a mating interface for the connector.

In some embodiments, each of the first and second conductors forming a terminal may be part of a terminal subassembly. Each subassembly may have a plurality of conductors, with the conductors of a first and a second subassembly engaging to form a terminal with a power tap off interface, a mating interface and a mounting interface. In some embodiments, each terminal subassembly may include multiple conductors. The terminal subassemblies may include an insulative portion holding the conductors of that terminal subassembly. For a terminal subassembly with conductors having openings therethrough, the conductors may include alignment features such that the holes can be readily aligned, which controls the force required to insert tails of other conductors through the openings.

Turning to the figures, specific non-limiting embodiments are described in further detail. The various systems, components, features, and methods described relative to these embodiments may be used either individually and/or in any desired combination as the disclosure is not limited to only the specific embodiments described herein.

FIG. 1 shows a Printed Circuit Board ("PCB") 200 connected to PCB 240 via a connector, which in this example is a card-edge connector 220. PCBs mechanically support and electrically connect one or more electronic components using conductive traces, pads, and other features etched from one or more conductive layers laminated onto layers of a non-conductive material. Traditionally, conductive layers are made from copper and non-conductive layers are made from woven fiberglass and flame-resistant epoxy resin binders. PCBs are generally made with interspersed conductive layers of conductive traces that carry signals and layers that are largely continuous sheets. The largely continuous layers serve as grounds for the signal traces and can also carry power, and are sometimes called power planes.

In the embodiment of FIG. 1, PCB 200 is illustrative of a portion of a power supply unit (PSU) configured for insertion into a card-edge connector via a parallel board (straddle-mount) arrangement. Other arrangements, such as vertically oriented or right-angle oriented connections are also possible. PCB 200 contains two conductive pads 202 configured to supply power and six conductive pads 204 configured to supply signals, although it should be understood that any number of each could be used in alternate embodiments.

The power pads 202 of PCB 200 may be on an edge suitable for a contact surface, which may be inserted into a slot 224 of a card-edge connector 220 containing power terminals 222. In some embodiments, the conductive pads 202 may comprise a high-conductivity material able to conduct electric current sufficient for applications requiring at least 3000 W of power and having sufficient robustness to withstand repeated mating and unmating with a connector. For example, conductive pads 202 may be surface portions with cladding, such as a layer of Cu that has a thickness of at least 0.14 mm, or at least 0.5 mm, or at least 1 mm, or at least 1.5 mm, in some embodiments. The power supply may deliver relatively large currents, such as up to 60 A, 80 A, 100 A, 120 A, 180 A, 200 A or greater.

As illustrated in the example of FIG. 1, the power pads 202 may be wider than the signal pads 204. Such a design enables the power pads 202 to carry more current than the signal pads 204, without excessive heating. The larger cross-sectional area of the power pads 202 provide a lower contact resistance, a lower bulk resistance, and a lower current density, all of which contribute to less heating within the connector when a relatively large amount of current passes through the power pads 202.

Power terminals 222 in the card-edge connector may similarly be designed to pass larger amounts of current with an acceptable amount of heating. Current flow is often used as an indication of delivered power, because power and current are related, and heating is proportional to current flow. Acceptable heating may be expressed as temperature rise at a rated current. As a specific example, a connector, or a power terminal within the connector, may have a rated current capacity that reflects the amount of current that will increase the temperature from ambient conditions by a set amount, such as 30° C. For example, the heating in the connector may be below this threshold amount when a high current, such as 60 A, 80 A, 100 A, 120 A, 180 A, 200 A or greater in some embodiments is transmitted.

Card-edge connector 220 passes electrical signals and/or power between PCB 200 and PCB 240. To do so, card-edge connector 220 contains a slot 224 which receives PSU PCB 200. This slot can be uniform, if the card to be inserted has a consistent thickness along its insertion edge, or non-uniform if this thickness varies. Once inserted, power terminals 202 and signal terminals 204 come into contact with one or more conductive elements 222 that pass electrical signals and/or power to PCB 240. These elements may be formed of conductive materials and may be sufficiently robust to allow for the repeated mating and unmating with a mating component, such as a card edge like that on PCB 200 or conductive elements of a mating connector. PCB 204 may contain components (not shown) that use, condition, or otherwise interact with the electronic signals and/or power transmitted across card-edge connector 220. Power may be distributed to these components through power pads 242, 244, 246, to which the conductive elements of connector 220 are electrically and mechanically connected. The components may be connected directly to the pads. Alternatively, the pads and the components may be connected through conductive layers within the PCB, which are sometimes referred to as power planes.

In some embodiments, the various functions of these components may require different and incompatible electronic signals and/or power. For example, some components may require 5V whereas other components may require 12V. As such, the designs of PCB 200, card-edge connector 220, and PCB 240 are constructed to provide discrete electric pathways as required for different voltage levels.

The Inventors have recognized that in the card-edge connector embodiment shown in FIG. 1, the full amount of current that is transmitted to PCB 240 across card-edge connector 220 is distributed to the power planes of PCB 240, creating a high current density in the PCB 240 adjacent connector 220. As such, the amount of current that can be transmitted is limited by both the thickness of each power plane and the number of power planes in the region of PCB 240 adjacent connector 220. Making thicker power planes may undesirably increase the size, cost and/or manufacturing complexity of the PCB. Adding additional power planes may increase the amount of power that can be transmitted via PCB 240. More power planes add cost, weight, and thickness to the PCB and to an electronic assembly incorporating it. The number of power planes required to supply large currents (e.g., 60-100 Amps, 180-260 Amps, etc.) may therefore be undesirable. In scenarios in which a PCB is designed for possible upgrades that will draw high currents, initial construction with enough power planes to support future high currents may similarly be undesirable.

In some embodiments described herein, a PCB may be designed with fewer power planes than are necessary to carry a desired maximum current. One or more connectors with power tap off interfaces may be mounted to the PCB. When more power than can be carried by the power planes is desired, a conductive interconnect, such as a busbar or cable assembly, that may distribute power to locations on the PCB remote from the one or more connectors, may be connected to a power tap off interface. To facilitate a separable connection to a conductive interconnect, the power tap off interface may also be configured as a mating interface. The conductive interconnect may extend in a direction parallel to the PCB.

The one or more connectors may have multiple interfaces, including a first mating interface, which may be configured as a mating interface of a conventional card edge connector. Current may be supplied to the connector through the first mating interface and then distributed through other interfaces of the connector to the PCB directly or to the conductive interconnect, which may pass over the PCB. Splitting the current within the connector reduces the current density in the PCB adjacent the connector. In some embodiments, a terminal used in such a connector may have two mating contact portions and a tail portion, supporting a mating interface, a power tap off interface and a mounting interface.

Figure 2:
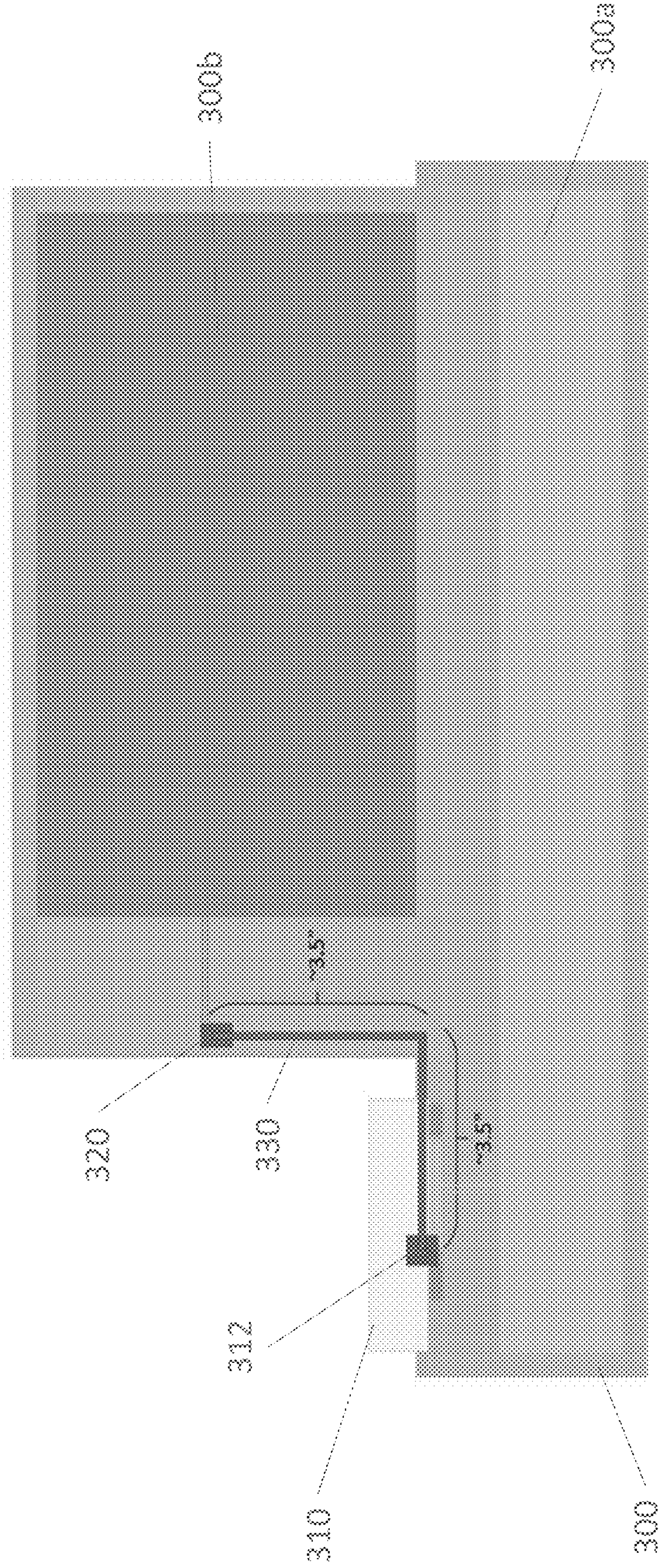
FIG. 2 is a schematic view illustrating distribution of power supplied through a card-edge connector in part through a conductive interconnect, such as a busbar, and in part through power planes in a PCB, according to one illustrative embodiment.

FIG. 2 is a schematic illustration of a PCB 300 with such a card-edge connector 310. In this example, connector 310 may be configured to mate with a PSU (not illustrated in FIG. 2). Card-edge connector 310 contains a power tap off interface 312 which is configured to receive a conductive interconnect, which in this example is a busbar 330. Mating interface 312 enables power to be tapped off from within connector 310 and delivered through the conductive interconnect to a remote location on the PCB 300.

Busbar 330 may be implemented as a metallic strip, such as a metal bar. The busbar may be insulated or uninsulated and may have sufficient thickness to be unsupported or, in some embodiments the busbar may be supported in air by insulated pillars. These features enable the busbar to be air cooled. In some embodiments, the bus bar is bent at a right angle, forming two legs, with each of its two legs between 2" and 24" long, and in some embodiments between 3" to 10", such as 3.5" in some embodiments. A busbar may be configured to carry power at a single voltage or may be configured to carry power of multiple voltage levels. In embodiments in which the busbar is configured to carry power at multiple voltage levels, the busbar may contain multiple, electrically insulated metal strips.

A first end of busbar 330 may be inserted into mating interface 312, which here serves as a power tap off interface. Mating interface 312 may be configured as a card-edge connector with a slot of sufficient width to receive the busbar 330. A second end of busbar 330 may be coupled to the power planes of PCB 300 at a location remote from connector 310. In the illustrated example, busbar 330 is inserted into a second connector 320 to provide coupling to PCB 300. Connector 320 may similarly have a mating interface configured to receive the busbar 330. As power is supplied via card-edge connector 310, a first portion of the power may pass through the mounting interface of connector 310 to PCB 300 in the vicinity of connector 310. A second portion of the power may be tapped off and transmitted to PCB 300 via busbar 330 and connector 320. Once coupled to the PCB, the power may be distributed to components attached to the PCB through power planes in the PCB.

In the example of FIG. 2, the first portion of the power is delivered to section 300*a* of PCB 300 and the second portion of the power is delivered to section 300*b* of PCB 300. In the schematic shown in FIG. 2, section 300*a* and section 300*b* are on the same PCB but are not electronically connected. However, it is not necessary that the sections 300*a* and 300*b* be electrically decoupled. In some embodiments, PCB 300 may be implemented as a conventional PCB with power planes that extend substantially continuously throughout the PCB. Even in such a configuration, current flow may split based on the power draw of components and electrical properties of PCB 300. Thus, even if the sections are not physically separate, the power flow throughout each of the sections 300*a* and 300*b* is less than the total supplied power, resulting in lower maximum power density in the PCB than without busbar 330.

While this embodiment shows a single busbar 330 and traces from each connector 310 and 320 to respective sections of the PCB, it should be appreciated that FIG. 2 is a schematic illustration of current splitting. FIG. 2 is provided to schematically illustrate lower maximum current density, with lower maximum heat generation per unit area of the PCB, that enables the assembly formed with busbar 330 to operate at a higher power level than without busbar 330.

Figure 3A:
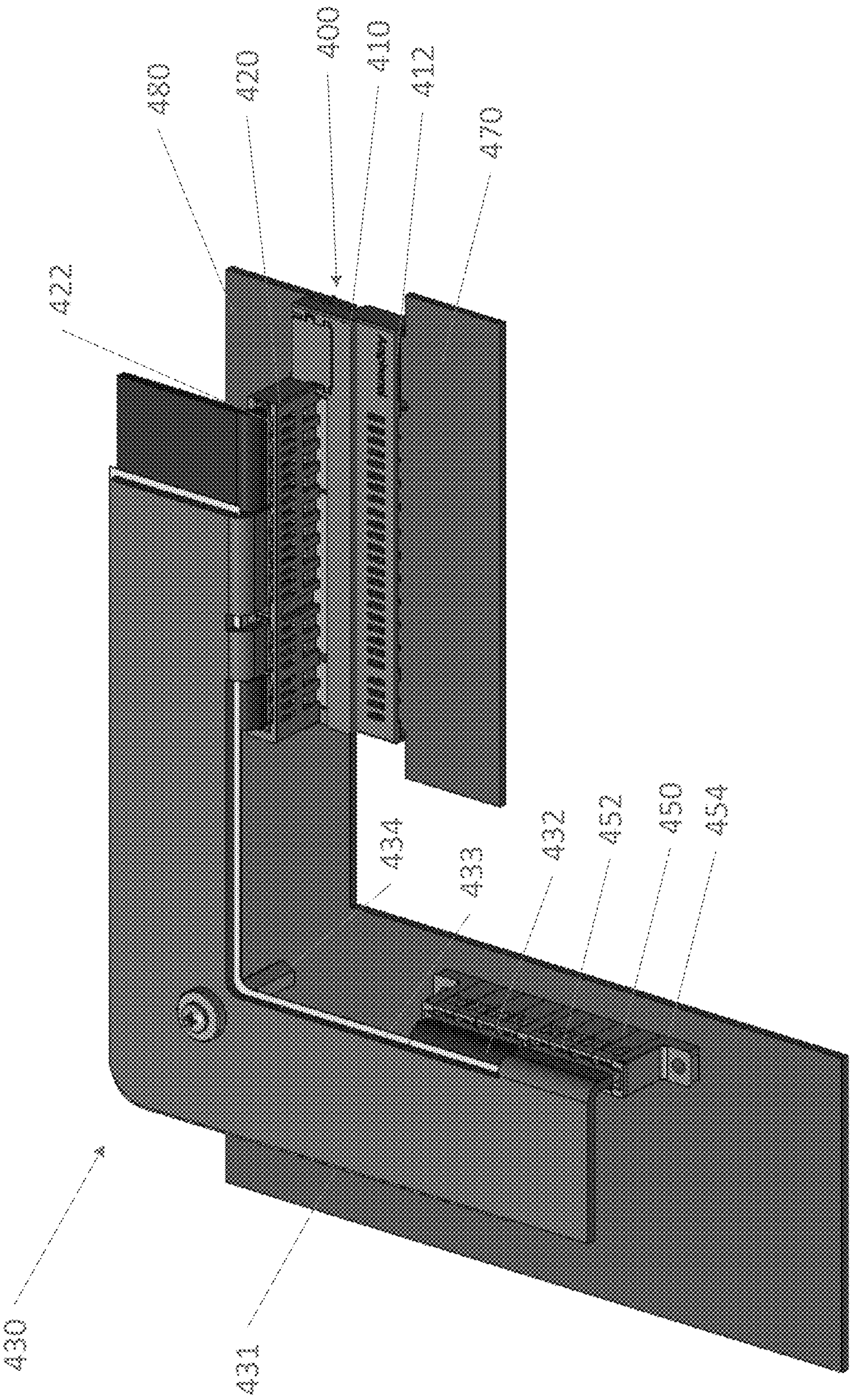
FIG. 3A is a perspective view of an exemplary embodiment of a portion of an electronic device with card-edge connector mounted to a PCB with busbars connected to distribute power to components on the PCB.
Figure 3B:
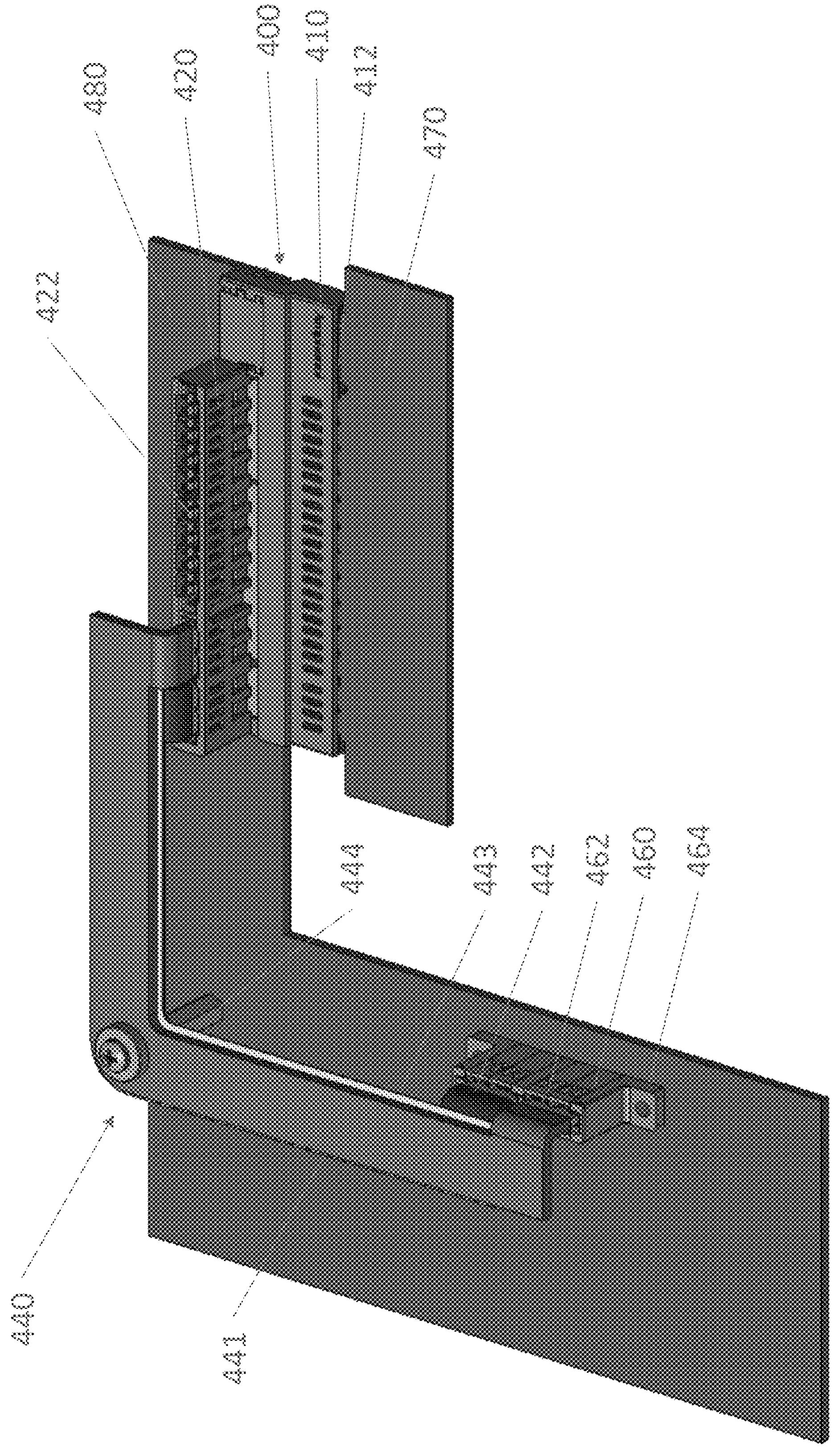
FIG. 3B is a perspective view of a portion of an alternate embodiment of an electronic device with card-edge connector mounted to a PCB with busbars connected to distribute power to components on the PCB.

FIGS. 3A-B show two possible configurations of the connector with power tap off schematically shown in FIG. 2. In both figures, the PCB and card-edge connection arrangement remains the same, although in alternate embodiments they may be different. In both figures, a source of power, here illustrated as PSU 470, is inserted into slot 412, forming a first horizontal mating interface 410 of L-shaped card-edge connector 400. Electrical signals and a first portion of the supplied current is coupled to PCB 480 through L-shaped card-edge connector 400, which may have a board mounting interface as in a conventional connector.

In addition, a portion of the supplied current may pass through a second vertical mating interface 420 of connector 400, serving as a power tap off interface. In this example, vertical mating interface 420 includes a second slot 422 into which a busbar 430, in the case of FIG. 3A, or busbar 440, in the case of FIG. 3B, is inserted. A second portion of the supplied current may be carried to connector 450, which includes a third mating interface 452 and second mounting interface 454, via busbar 430 in FIG. 3A. In the example of FIG. 3B, current is delivered to connector 460, which includes a third mating interface 462 and second mounting interface 464, via busbar 440. From the remote connector 464, the second portion of the current may pass into PCB 480 adjacent connector 450 or 460, enabling that second portion to be distributed to components mounted to PCB 480, without increasing the current density adjacent connector 400.

In the illustrated embodiment, busbars 430 and 440 are configured with two electrically separate paths. To support this function, busbar 430 contains a first portion 431 and a second portion 432 in the example of FIG. 3A, and busbar 440 contains a first portion 441 and a second portion 442 in the example of FIG. 3B. In both figures, these portions may be separated by sheets of insulation, 433 in FIG. 3A and 443 in FIG. 3B. These first and second portions may be configured to transmit electric power of different characteristics, such as different polarities to provide a supply and a return, different voltages, or different frequencies. In other embodiments, the portions of the busbar may be electrically coupled and may transmit electric power of identical characteristics with higher current carrying capacity than one portion alone.

In some embodiments, an insulative support, an example of which is post 434 in FIG. 3A and 444 in FIG. 3B, may provide additional structural support to busbars 430 and 440. In this example, the posts hold busbars 430 and 440 parallel to PCB 480. In this example, busbars 430 and 440 bend at an approximately 90-degree angle, and the posts provide support at the bends.

Busbar 440 in FIG. 3B is configured with different dimensions than busbar 430 in FIG. 3A. Busbar 440 has a reduced cross-sectional area relative to busbar 430. Busbar 440 may be used, for example, in applications with lower power requirements than those of busbar 430. For example, busbar 430 could be configured to carry a maximum current between 180-260 Amps, such as 220 Amps, whereas busbar 440 could be configured to carry a maximum current between 60-100 Amps, such as 80 Amps. The reduced cross section of busbar 440 also means that it contacts fewer of the terminals within the second mating interface 420 of connector 400.

System configurations as shown in FIGS. 3A and 3B may result from using a PCB 480 to which a connector 400 is attached. Connector 400 has a mating interface that may mate with a PSU or other component through which current may be supplied. Connector 400 also includes a mounting interface in which terminals inside the connector are connected to PCB 480, coupling current received through the mating interface into the power planes within PCB 480. In some embodiments, there may be a sufficient number of power planes in PCB 480 for current to pass through the mounting interface of connector 400 without exceeding the current rating at any portion of PCB 480.

In such a configuration, no conductive interconnect may be inserted into the second mating interface 420 of connector 400. In such a configuration, a second connector, such as connectors 450 and 460 may be present, but not connected to connector 400 through a conductive interconnect separate from PCB 480. Alternatively, the second connector may be omitted.

Nonetheless, PCB 480 may be manufactured with a footprint for a second connector, which may be used to mount a second connector when the power draw of all the components mounted on PCB 480 will cause the current density in the vicinity of connector 400 to exceed the current carrying capacity of the power planes within PCB 480. In that scenario, a second connector, such as connector 450 or 460, may be mounted in the footprint and connected to connector 400 through a conductive interconnect capable of carrying a portion of the supplied current from connector 400 to the second connector without passing through PCB 480.

The configuration of the second connector, and of the conductive interconnect joining the first and second connectors, may depend on the amount by which the current required for operation of the components on PCB 480 exceeds the current carrying capacity of the power planes in the vicinity of connector 400. The second connector may be sized to receive a wider busbar, for example, when the required current exceeds the current capacity by a larger amount. As specific examples, PCB 480 may be designed with 18 or fewer layers but may nonetheless carry up to 60 Amps. If the required current is between 60 and 100 Amps, a busbar as shown in FIG. 3B may be added to carry an additional 40 Amps. If a current between 100 and 200 Amps is required, a busbar as shown in FIG. 3A may be added to carry up to an additional 140 Amps, for example.

In this example, a connector mounted to PCB 480 may be configured based on the amount of current to be diverted from the first connector to the second connector. Alternatively or additionally, the conductive interconnect between connectors may be configured based on the amount of current to be diverted. As illustrated in FIG. 3B in connection with the second mating interface on connector 400, a bus bar may be inserted into only a portion of a slot that forms the mating interface. Using this technique, a larger connector suitable for diverting a relatively large amount of current, such as connector 450, may be mounted to PCB 480. If a system is configured such that less than the full amount of this large current needs to be diverted, a smaller busbar may be used and a portion of the mating interface of the larger connector 450 may be unoccupied.

Figure 4:
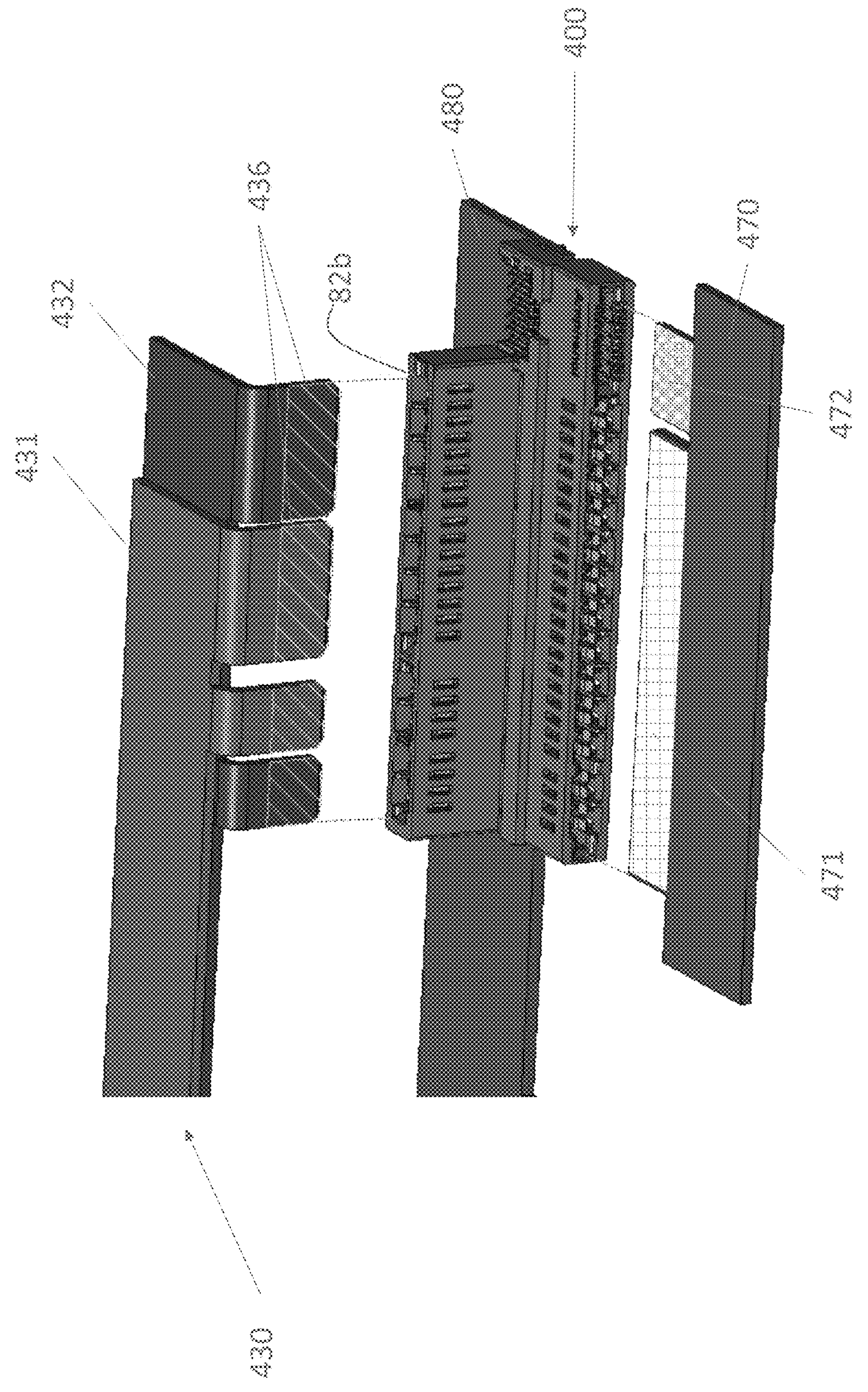
FIG. 4 is a perspective, partially exploded view of a portion of the electronic device of FIG. 3A, including a connector mounted to a PCB and mated to a card edge of a power supply unit and a busbar, according to one illustrative embodiment.

FIG. 4 shows the connector from FIG. 3A with busbar and PSU disconnected. A plurality of conductive elements within L-shaped card edge connector 400 are configured to electrically connect portions of at least three surfaces. In the embodiment shown in FIG. 4, those surfaces are non-coplanar and are on the following components: the power terminals 436 of busbars 431 and 432; and the power terminals 471 and signal terminals 472 of PSU 470; and PCB 480. In the embodiment of FIG. 4, busbar 430 includes two electrically separate portions, 431 and 432, stacked one above the other. Each of the portions may have terminal portions forming power terminals 436. A tap-off interface 82*b* is shown.

Figure 5B:
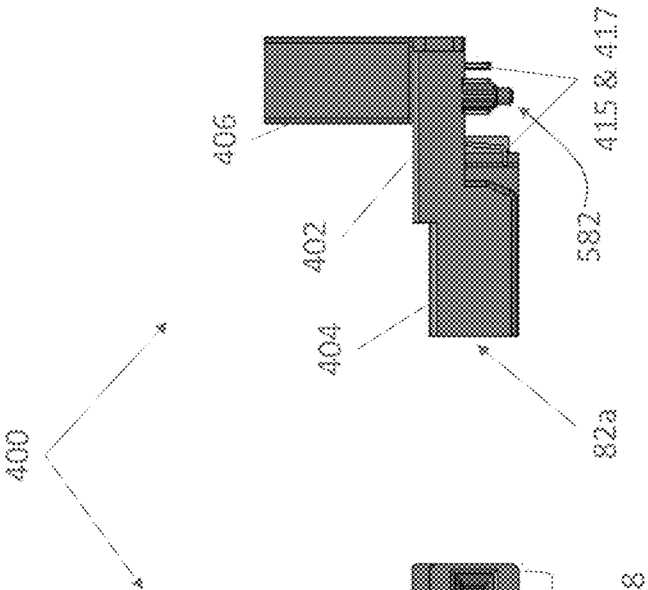
FIGS. 5A and 5B are a front view of the card-receiving face and right side view, respectively, of an exemplary embodiment of a card-edge connector configured for bus bar tap-off.
Figure 5A:
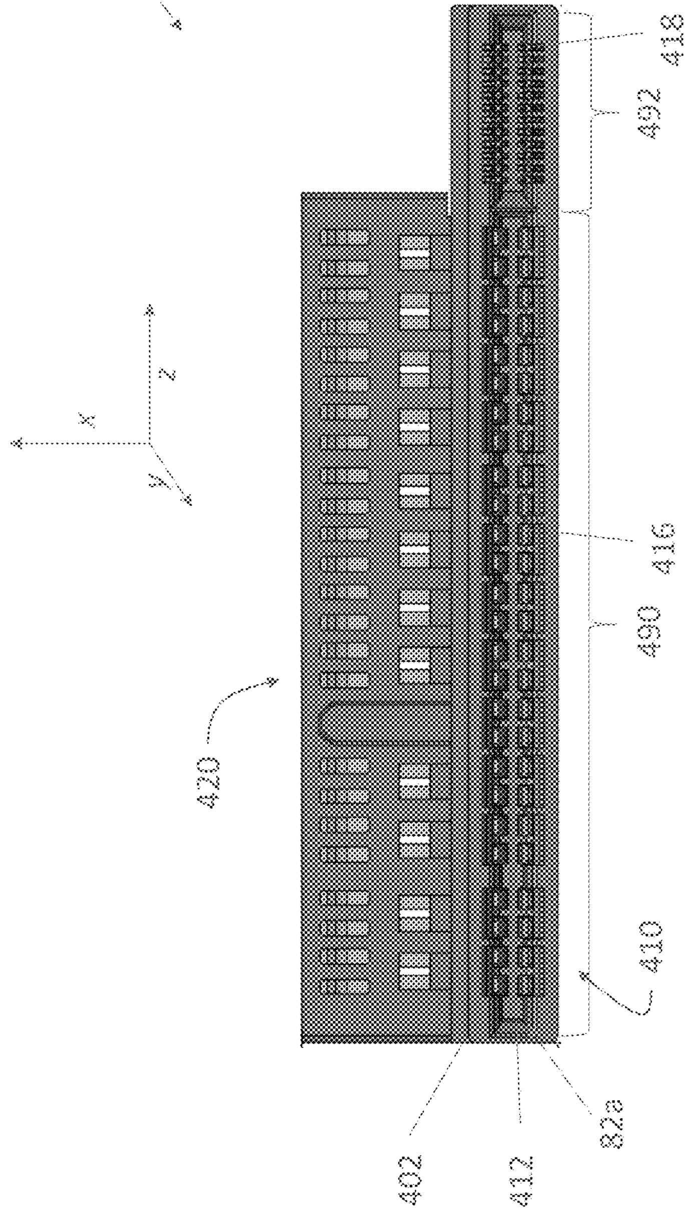

FIGS. 5A and 5B show front and side views, respectively, of L-shaped card-edge connector 400. Connector 400 has an L-shaped housing 402. Housing 402 could be formed of a rigid, insulative material capable of withstanding the high heat generated by the transfer of high voltage electricity. Housing 402, for example, may be molded from high temperature plastic with fiberglass fillers. Housing 402 may be molded as one or more components. When housing 402 is formed of multiple components, the components may interlock, snap together or otherwise be joined.

L-shaped housing 402 provides a first mating interface 410 and a second mating interface 420 and a mounting interface 582. In the example of FIGS. 5A and 5B, housing 402 has a horizontal section 404, which will be parallel to a surface of a printed circuit board to which connector 400 is attached. The first mating interface 410 is formed in the horizontal section. Housing 402 also has a vertical section 406. The second mating interface 420 is formed in the vertical section. A mating interface 82*a* is shown.

In the embodiment illustrated, mounting interface 582 is formed at the intersection of the horizontal and vertical sections. The illustrated configuration supports parallel board connections between a PCB to which connector 400 is attached and a board inserted into the first mating interface 410, such as is illustrated in FIGS. 3A and 3B. However, other relative positions of the mating and mounting interfaces are possible to support other system configurations.

In some embodiments, the horizontal and vertical sections could be of the same length. In other embodiments, such as the embodiment shown in FIGS. 5A and 5B, these sections could be of different length. In the illustrated embodiment, the first mating interface 410 has a power portion 490 and a signal portion 492. In this example, the second mating interface supports only power connections and is approximately the same length as the power portion 490 of the mating interface. In some configurations, however, only a portion of the power supplied through the first mating interface is delivered to components of the PCB to which connector 400 is attached and the second mating interface may be shorter than even the power portion 490 of the first mating interface 410.

Both mating interfaces 410 and 420 are configured, in this embodiment, as card edge connectors. The housing 402 comprises a first slot 412, forming a portion of the first mating interface 410 and a second slot 422 (FIG. 3A) forming a portion of the second mating interface 420. In this embodiment shown, slots 412 and 422 are offset by an angle of 90 degrees, resulting in an L-shape, but it should be understood that other angular offsets are possible to support different system configurations. In this embodiment, the housing 402 is configured to receive a PCB configured for edge connection (e.g., a PSU) in the first slot 412 and a conductive interconnect, such as a busbar, in the second slot 422.

Located within housing 402 are two types of terminals. The first types of terminals 416 transmit electric power and the second type of terminals 418 transmit electric signals. In the embodiment illustrated, the power terminals are configured to make power connections between the first mating interface 410, second mating interface 420 and mounting interface 582. The signal terminals 418 may be shaped as in a conventional connector or otherwise to provide connections. Tails 415 and 417 of terminals 416 and 418 are exposed at mounting interface 582 where they can be attached to a printed circuit board. In the example of FIG. 5B, the tails protrude from the underside of card-edge connector 400. The tails are configured to electrically connect a card-edge connector 400 to a PCB for the purposes of transmitting electrical power and signals. The tails may be shaped for attachment to a PCB via soldering, press fitting, or any other attachment technique. In some embodiments, different tail configurations may be used for signal and power terminals. Power connections, for example, may be made through post in hole soldering and signal connections may be made through surface mount soldering or may be press fit.

Figure 6B:
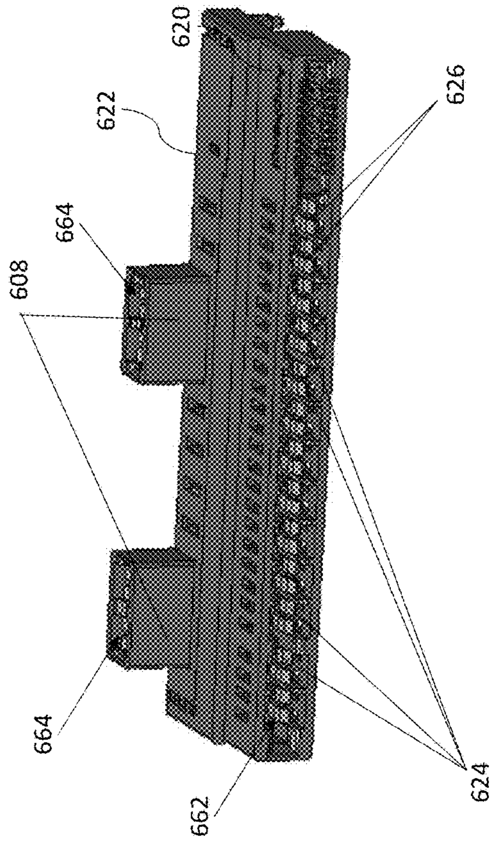
FIGS. 6A and 6B are front perspective views of additional exemplary embodiments of card-edge connectors configured for cable tap off.
Figure 6A:
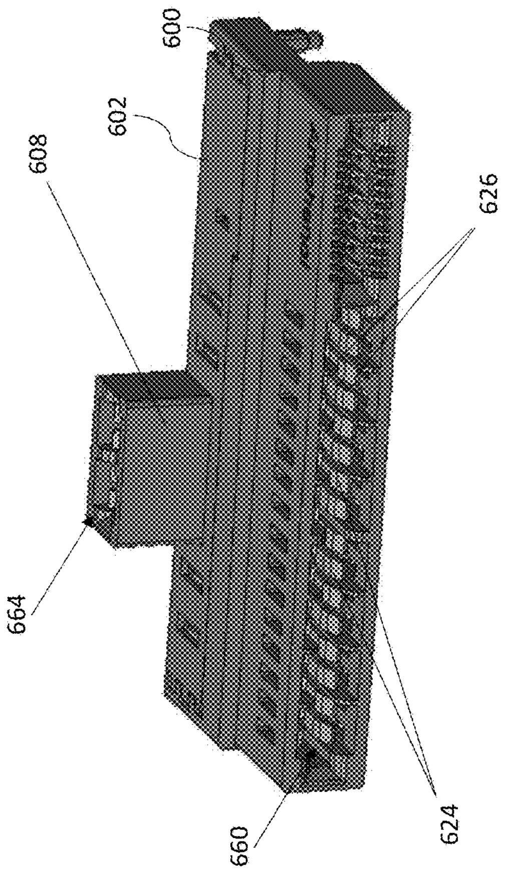

FIGS. 6A-6B illustrate alternative embodiments of a connector configured for use in a system in which a first portion of the power supplied through a connector may be delivered to an electrical assembly (e.g., a PCB, another connector, etc.) through a mounting interface of the connector and a second portion may be delivered to a remote location on the electrical assembly through a conductive interconnect.

As shown in FIGS. 6A-6B, a connector housing, such as housing 600 or housing 620, may hold terminals that provide a plurality of mating interfaces. For example, in some embodiments, housing 600 or housing 620 may include a plurality of first type terminals 624 and a plurality of second type terminals 626. First type terminals 624 may be power terminals configured for making power tap off connections in addition to connections at a mating interface and a mounting interface and second type terminals 626 may be conventional power terminals, making connections between a mating interface and a mounting interface.

In these examples, the first type terminals 624 have two mating contact portions and a tail for mounting to a PCB. One of the mating contact portions is positioned within mating interface 660 or 662 in a main body of housing 600 or 620 and the second in positioned within a chimney like projection 608 extending from the main body. The second type terminals 626 have one mating contact portion and a tail for mounting to a PCB. The mating contact portion is positioned within mating interface 660 or 662 in a main body of housing 600 or 620, as in a conventional power connector. In this example, both the first and second type terminals have similarly shaped mounting tails and similarly shaped mating contact portions within the main body of housing. In this example, the mating contact portions of the first type terminals within projection 608 are the same as the mating contact portions within the main body of the connector housing. However, it is not a requirement that all terminal types have identical mating contact portions.

In the example of FIG. 6A, multiple ones of the first type terminals 624 are grouped together while multiple ones of the second type terminals 626 are grouped together. In this example, from left to right, in the embodiment of first housing 600 (shown in FIG. 6A), first housing 600 includes a first grouping of the second type terminals 626, followed by a second grouping of the first type terminals 624, followed by a third grouping of second type terminals 626. Alternatively, in the embodiment of second housing 620 (shown in FIG. 6B), second housing 620 includes a first grouping of the second type terminals 626, followed by a second grouping of the first type terminals 624, followed by a third grouping of second type terminals 626, followed by a fourth grouping of the first type terminals 624, followed by a fifth grouping of second type terminals 626.

Regardless of the number of groups and the shape of the terminals within each group, each group of first type terminals with mating interfaces within a projection 608 may form a mating interface for power tap off via the connector. In the embodiment of FIG. 6A, one such tap off interface is shown. In the embodiment of FIG. 6B, two such tap off interfaces are shown. In some embodiments, a power connector may be configurable to have none, 1, 2, 3 or, in some embodiments, more tap off interfaces. The housing components may have multiple locations, each of which may receive a terminal subassembly. Terminal subassemblies with either the first type terminals or the second type terminals may fit within each location. In this way, a connector may be assembled by inserting terminal subassemblies with the first type terminals in locations at which a tap off interface is to be formed and conductive element subassemblies with the second type terminals in other locations.

The connector housing may also be configurable. As shown in FIGS. 6A and 6B, housings 600 and 620, respectively, are shaped to receive covers 602 and 622, respectively. Each of the covers may have an opening such that portions of conductive elements forming the tap off interface may pass through the cover. In this way, the housing may be configured for a desired number of tap off interfaces by attaching a cover with openings aligned with the desired number of tap off interfaces.

A cover may alternatively or additionally enable the insertion of terminal subassemblies into the connector housing. For example, a connector housing may be constructed with an open rear portion such that, with the cover removed, terminal subassemblies of both the first and second type may be inserted from the rear. The cover may then be installed in a downward direction with openings in the cover aligned with the first type conductive elements that extend out of the housing at a power tap off interface.

Further, a cover may provide a mechanism to incorporate into a connector one or more projections 608, which provide mechanical support for a desired number of tap off interfaces. Projection 608 may be formed as an integral portion of or may be attached to cover 602 in locations where there is an opening in the cover for mating portions of the first type conductive elements to pass through.

Figure 6C:
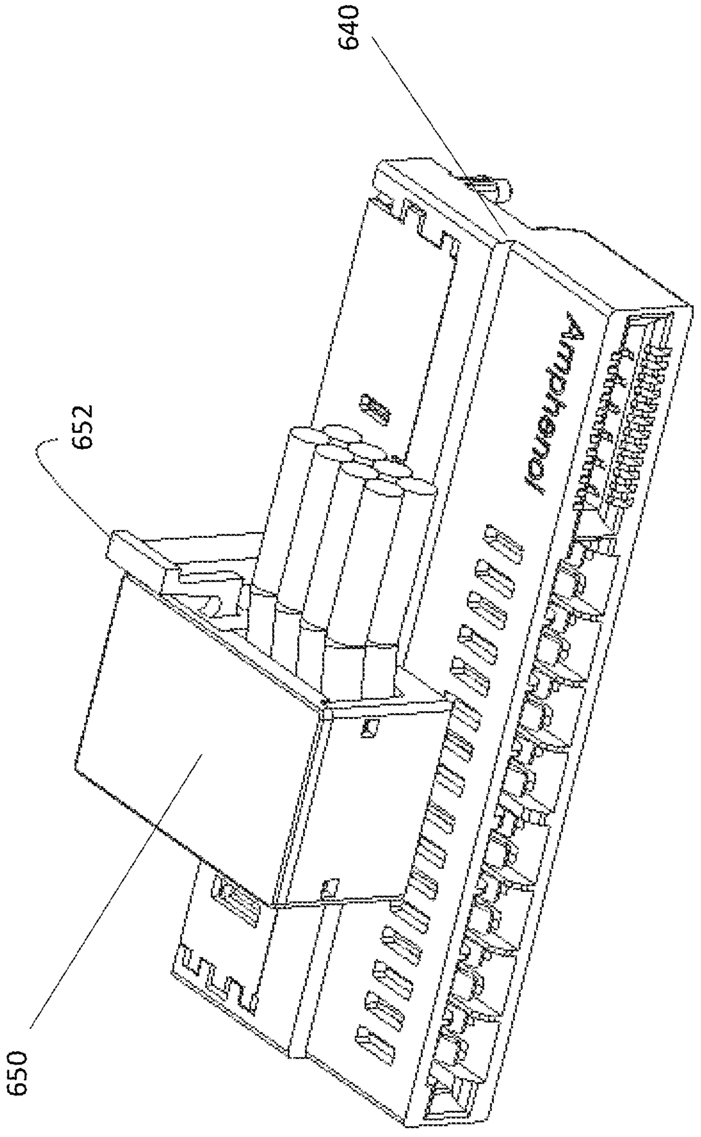
FIG. 6C is a front perspective view of the card-edge connector of FIG. 6A mated to a cable assembly, with the cable cut away.

Regardless of the number of power tap off interfaces, each tap off interface may mate with a conductive interconnect, such as a bus bar or a cable assembly. In the embodiment of FIG. 6C, a connector is illustrated with a single power tap off interface and a cable assembly mated to that interface. The connector of FIG. 6C may be constructed using techniques as described above, and in this example is shown with a housing 640 that has been configured to provide a power tap off interface to which a cable connector 650 has been mated.

Cable connector 650, for example, may have an opening configured to receive a projection 608 that bounds the power tap off interface, as described above in connection with FIGS. 6A and 6B. Mating contact portions within that opening may extend into the mating interface 664 and make contact with the mating contact portions of the first type terminals at the mating interface 664.

One or more mechanisms for mechanical support of cable connector 650 and/or to secure cable connector 650 to connector housing 640 may be provided on the cable connector 650 and/or the housing 640. In this example, cable connector 650 includes a latch 652 with a hooked end that engages a complementary latching element on the connector housing 640. For example, a projection 608 may include a complementary latching element.

Figure 6E:
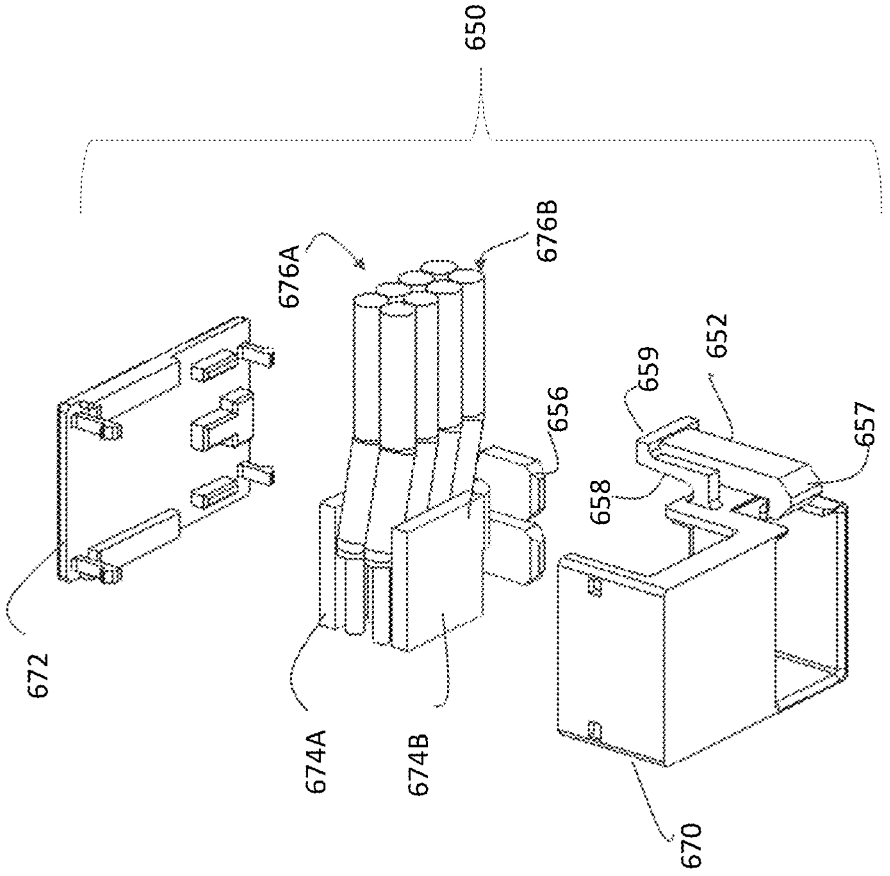
FIG. 6E is an exploded view of the cable assembly of FIG. 6D.
Figure 6D:
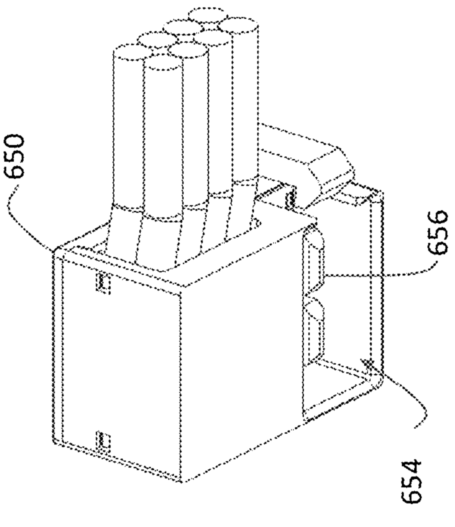
FIG. 6D is a bottom perspective view of the cable assembly of FIG. 6C.

FIG. 6D is a bottom view of a cable assembly including connector 650 in an unmated position. In this perspective, opening 654, sized to receive a projection 608 is visible. Mating contacts 656 of conductive elements are visible within opening 654. In the embodiment illustrated in FIGS. 6A and 6B, each of the mating interfaces 664 is formed from two conductive element subassemblies. A corresponding number of mating contacts 656 are shown in FIG. 6C, each aligned with one of the conductive element subassemblies.

FIG. 6E is an exploded view of the cable assembly with connector 650. In this example, connector 650 includes a housing 670 and a cover 672. These components may be made of an insulative material, such as a polymer with reinforcing filler, such as glass fibers. Housing 670 and a cover 672 may be made with interlocking features, such as snap-fit features, such that cover 672 may be attached to housing 670 after conductive elements 674A and 674B are inserted into housing 670.

One or more cables are attached to each of the conductive elements 674A and 674B. In this example, cable groups 676A and 676B are attached to conductive elements 674A and 674B, respectively. Each cable group 676A and 676B includes one or more cables, and are here shown with four cables. However, the groups may have other than four cables and may have different numbers of cables than each other. Each of the conductive elements 674A and 674B has a first end to which the cables of a group are electrically and mechanically connected, such as by welding, brazing, soldering or crimping. A mating contact portion 656 is formed at a second end of each of the conductive elements 674A and 674B.

Housing 670 and/or cover 672 may be shaped to hold conductive elements 674A and 674B in position for mating to the complementary conductive elements at a mating interface 662. Additionally, housing 670 supports latch 652. Latch 652 is joined to housing 670 via flexible arm 658, which may, for example, be integrally molded with the rest of housing 670 from a polymer such that flexing of arm 658 enables the hooked end 657 of latch 652 to pivot. Hooked end 657 may pivot during mating such that the hooked end 657 may engage a latching element of a mating connector. Pivoting may also support un-mating. As shown, latch 652 includes an actuation end 659 opposite hooked end 657. Actuation end 659 is positioned for a user to press it towards housing 670, causing the hooked end 657 to pivot away from, and disengage from a latching element of a mating connector.

FIGS. 6D and 6E show a cable assembly formed by terminating cables groups 676A and 676B with a connector 650. A second end of the cable assembly is not shown. However, the cable assembly may be used as a conductive interconnect as described herein. The second end of the cable groups 676A and 676B, for example, may be terminated with a conventional cable connector and mated to a conventional connector mounted at an interior location on a PCB to which the connector with power tap off is mounted. However, other connections are possible.

FIGS. 3-6 illustrate various configurations of a power tap off connector, differing in various details of construction including whether the power tap off interface is configured for mating to a cable assembly or one or more bus bars. These configurations also differ in the construction of the housing. In each case, however, the connectors include power terminals to make connections among a mating interface, a power tap off interface and a mounting interface. FIGS. 7-12 illustrate techniques that may be used to manufacture reliable and low cost power terminals configured for making such connections. In these examples, the connector housings are configured for receiving at a mating interface a card edge, such as an edge of a PCB in a PSU. The power tap off interface is configured for mating with one or more bus bars, each configured to carry a single voltage. The bus bar, for example, may be a solid busbar.

In some embodiments, such a power terminal may be formed from two or more conductors that engage with one another through a mechanically rugged and low resistance coupling. In some embodiments, groups of one or more conductors may be held in a housing as a subassembly, and terminals may be assembled by engaging one subassembly to another.

Figure 7:
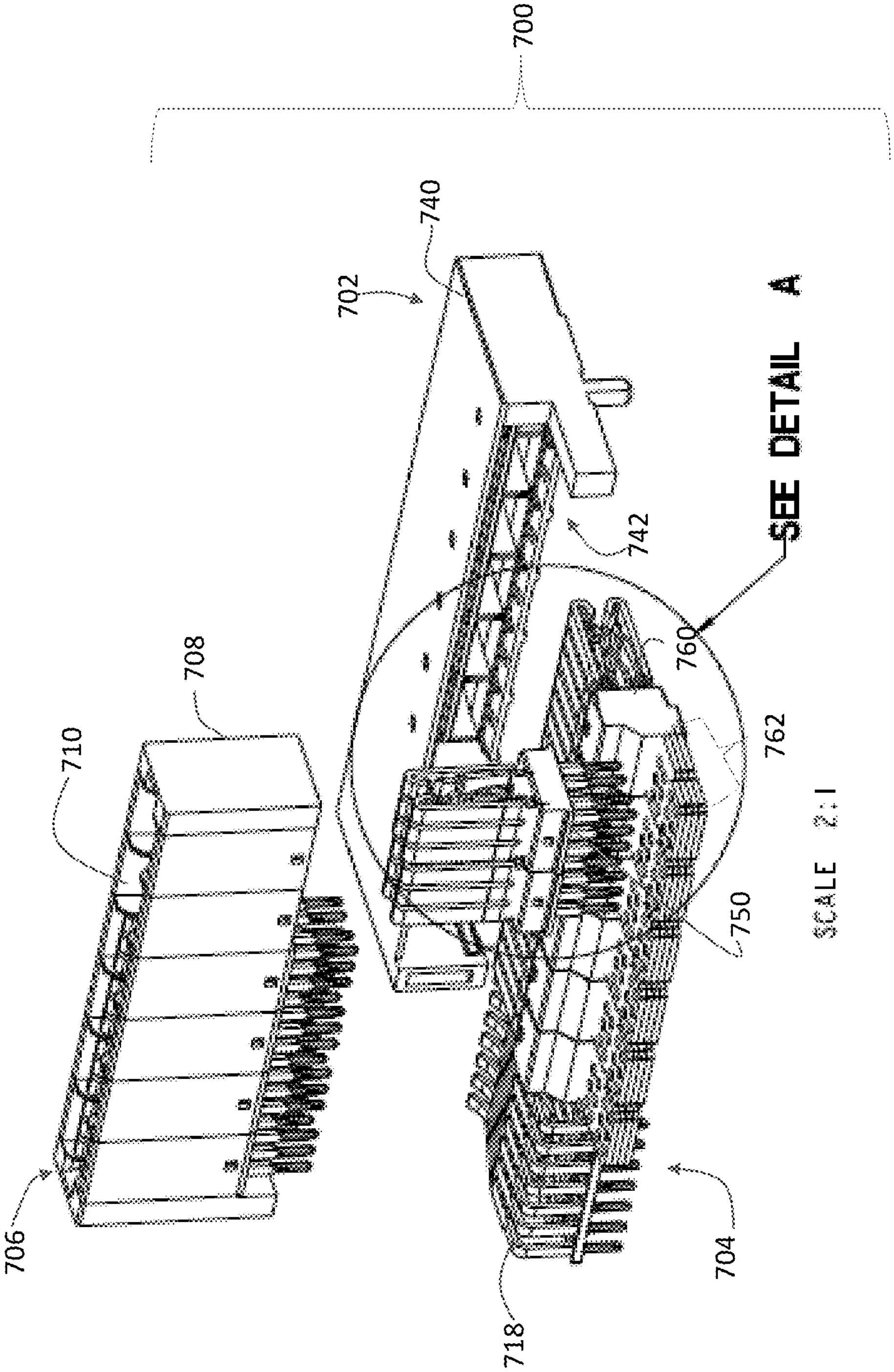
FIG. 7 is an exploded view of an exemplary embodiment of a card-edge connector configured for bus bar tap-off.

FIG. 7 is an exploded view of a connector 700. Connector 700 includes an insulative housing 740 that includes a slot (802, FIG. 8B) that, like slot 412, may serve as a mating interface 702. Mating interface 702 may receive an edge of a PCB, for example. To make connections to the signal pads on the edge of the PCB, connector 700 may include a plurality of signal terminals 718, with mating contact portions positioned at the mating interface 702 and tails extending to the mounting interface 704.

Connector 700 also includes an insulative projection 708, including a slot 710, which may serve as a power tap off interface 706. In this example the first slot 710 may be configured to receive one or more solid bus bars.

Connector 700 includes a plurality of power terminals to make connections among the mating interface 702, mounting interface 704 and the power tap off interface 706. In this example, each of the power terminals has mating contact portions positioned in each of the slots forming the mating interface 702 and power tap off interface 706. In this example, the mating contact portions include spring fingers on opposite sides of a slot that press against a member inserted into the slot. As all components of each terminal are electrically connected, the opposing spring fingers are configured for mating to a flat member, such as a solid bus bar, that has contact areas that are part of the same power circuit on opposing sides. However, other terminal configurations are possible. Groups of one or more terminals may be electrically isolated within connector 700. In the illustrated embodiment, electrical isolation is provided by inserting mating members that are connected to different power circuits in different portions of the mating interfaces, such as is described above in connection with FIG. 4. In the example of FIG. 7, each of the terminals is electrically isolated from the other terminals.

In the example of FIG. 7, each of the terminals is formed from a plurality of terminal subassemblies, here illustrated by terminal subassemblies 750 and 760. In this example, terminal subassemblies 750 and 760 each contains conductors, with the conductors of terminal subassemblies 750 and 760 extending in orthogonal directions such that they intersect. Housing 740 includes passages 742 that open into the slot (802, FIG. 8B) forming mating interface 702. A mating contact portion of a subassembly 760 may be inserted into each of the passages 742. Insulative projection 708 may contain similar passages, opening into slot 710 which may be orthogonal to the passages 742 that open into the slot (802, FIG. 8B) forming mating interface 702. Mating contact portions of subassemblies 750 may extend into the passages of projection 708.

Terminal subassembly 750 contains at least one conductor that has a mating contact portion positioned in the tap off interface 706 and tails that extend to mounting interface 704. Terminal subassembly 760 includes at least one conductor that has a mating contact portion positioned in the mating interface 702. The conductors of the subassemblies engage such that each terminal makes electrical connections between mating interface 702, mounting interface 704 and power tap off interface 706. In the example illustrated, the conductor(s) of terminal subassembly 760 each have a body portion 762 and the conductors of subassembly 750 pass through and engage that body portion.

Additional details of terminal subassemblies 750 and 760 are illustrated in connection with FIGS. 8A and 8B. In the illustrated example, each of the terminal subassemblies includes a plurality of conductors held in an insulative member. In this example, each of the terminal subassemblies is formed from four conductors, each stamped from a sheet of metal, such as a copper alloy. The insulative member is molded over the conductors to hold the conductors together.

For example, subassembly 760 has four conductors, conductors 862, 864, 866, and 868. Those conductors are held together by an insulative member 860. Each of the conductors may include one or more alignment features, such as notches 872, that may be aligned by an assembly tool before insulative member 860 is molded over the conductors.

In the illustrated example, each of the conductors of subassembly 760 has mating contact portions at a first end and a body portion with holes 870 at a second, opposing end. In this example, the mating contact portions are formed by spring fingers cut in a metal sheet forming the conductor. The mating contact portions face inwards, towards the center of slot 802 forming the mating interface. In the illustrated example, conductors on opposite sides of the slot 802 have opposing contacts, with conductor 862 opposing conductor 866 and conductor 868 opposing conductor 864.

Each of the conductors 862, 864, 866, and 868 may have a different shape. Conductors 862 and 866 are illustrated to be longer than conductors 864 and 868. Accordingly, the distal ends of conductors 862 and 866 extend closer to the entry 804 of slot 802 of mating interface 702 than the distal ends of conductors 864 and 868. Additionally, the conductors are here shown to be asymmetrical. In this example, the asymmetry positions the body portions with holes 870 near the mounting interface 704. In this example, this configuration is achieved by jogged portions in conductors 862 and 864, which jog their body portions towards the body portions of conductors 866 and 868. With this jog at an intermediate portion of the conductors, opposing ends of the conductors are in different planes. In contrast, 866 and 868 have their ends in the same plane. Conductors 866 and 868, adjacent the surface of slot 802 nearer the mounting interface 704, have straight bodies such that the conductor bodies are stacked one on top of the other adjacent mounting interface 704. The body portions of conductors 866 and 868 are parallel to the body portions of conductors 862 and 864, such that the body portions of conductors 862 and 864 and conductors 866 and 868 may be stacked side-by-side in parallel, as illustrated.

Subassembly 760 may include features that engage complementary features in housing 740. In this example, insulative member 860 includes one or more projections 894 that extend into openings 896 when a subassembly 760 is inserted into housing 740.

Figure 8B:
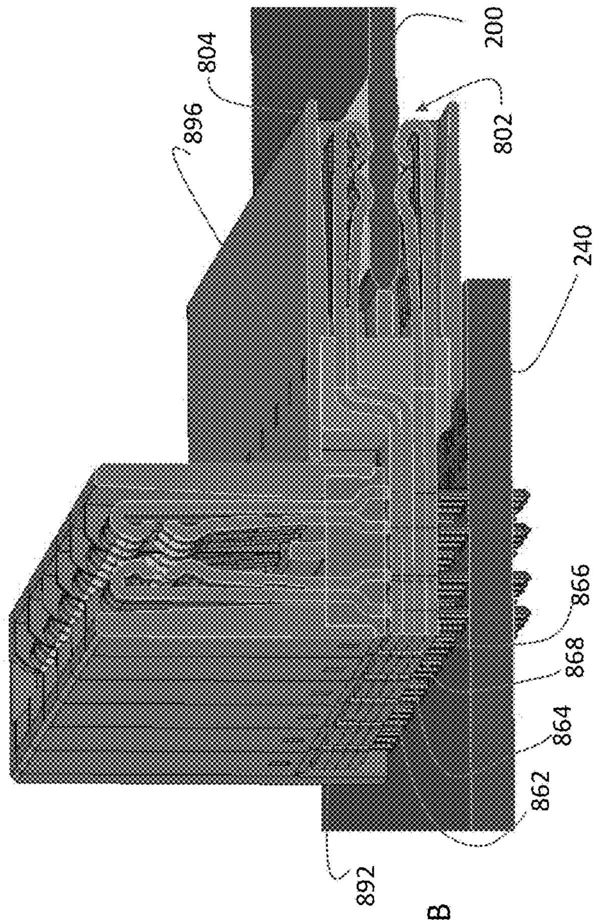
FIG. 8B is cross section of the card-edge connector of FIG. 7, mounted to a first PCB and mated with a second PCB, from the perspective indicated by line B-B in FIG. 8A.

Subassembly 750 may comprise an insulative member 850 and conductors 852, 854, 856, and 858. In the example, each of the conductors has, at one end, contact fingers and at an opposite end contact tails 950 (FIG. 9A). In this example, there are three contact fingers, but conductors with more or fewer contact fingers may be used. In the example of FIGS. 8A, 8B, 9A, 9B and 9C, conductors 852, 854, 856, and 858 have mating contact portions that are formed in the same way as the mating contact portions of 862, 864, 866, and 868. For example, conductors 852 and 856 are longer than conductors 854 and 858, such that conductors 852 and 856 extend closer to the opening of slot 710 than conductors 854 and 858.

Further housing 850 of subassembly 750 has a different shape than the housing 860 of subassembly 760. In this example, housing 850 is shaped to fit within an opening of projection 708. To hold subassembly 750 within projection 708, attachment features may be present on either or both of projection 708 and housing 850. In this example, housing 850 has one or more projections 890 that extend into openings 892 of projection 708 to hold the subassembly in projection 708.

Figure 9C:
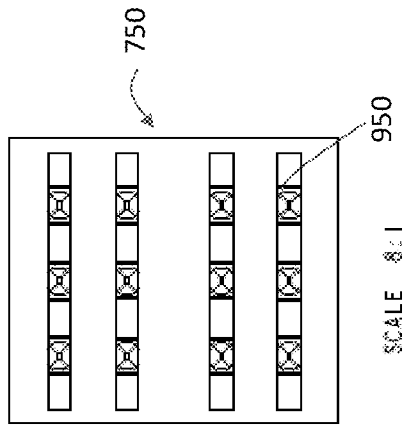
FIGS. 9A, 9B and 9C are a right side, back and bottom plan view of a terminal tap-off assembly of the card-edge connector of FIG. 7.
Figure 9B:
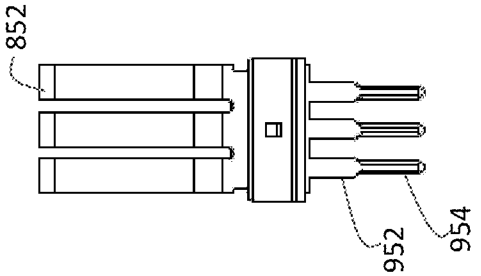

In this example, the portions of the conductors of subassembly 750 at an end opposite the mating contact portions include features that engage with the conductors of subassembly 760. In the illustrated example, those features may be tails 950 extending from a body of the conductors. As shown in FIGS. 9B and 9C, each conductor may have multiple tails. Three tails are shown in this example. Each of the tails may have a distal portion 954 shaped for attachment to a printed circuit board. In this example, distal portions 954 are shaped as solid pins for pin-in-hole mounting.

Tails 950 may further include an engagement portion, configured to engage with conductors of subassembly 760. The engagement portion may make an interference fit with openings in conductors of subassembly 760. In the example of FIGS. 9B and 9C, engagement portion 952 may have, for example, a rectangular cross section. Here, a square cross section is illustrated, so as to make an interference fit with circular openings 870 of the conductors of subassembly 760. An interference fit, for example, may be created with engagement portions 952 that have a diagonal that is larger than the diameter of the openings 870. The conductors of each may be configured to provide a low resistance electrical connection between the conductors of the two subassemblies while enabling that connection to be formed without excessive force. The resistance, for example, may be less than 5 Ohms, and less than 1 Ohm in some embodiments. The diagonal in cross section of engagement portion 952 may be larger than the diameter of openings 870 by between 3% and 20%, for example, or between 3% and 10% in some examples.

Figure 10:
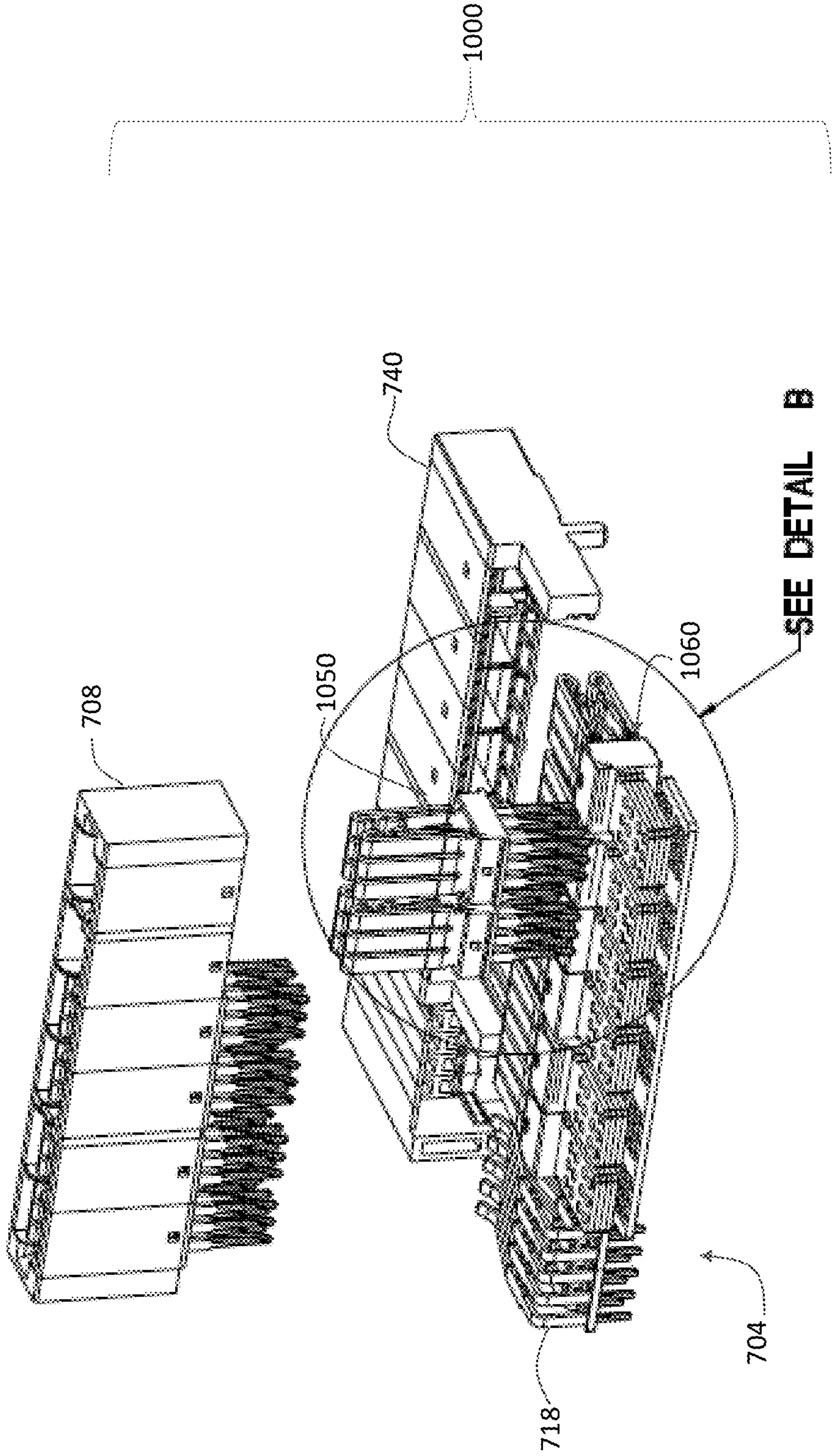
FIG. 10 is an exploded view of an exemplary embodiment of a card-edge connector configured for bus bar tap-off.

FIG. 10 shows an alternative construction of a connector with terminals formed by engaging multiple subassemblies. In this example, the mating interface, the mounting interface and the tap off interface of connector 1000 may be the same as for connector 700. Accordingly, housing 740 and projection 708 may be as described above. Connector 1000, however, may differ from connector 700 with respect to the shape of the conductors in the subassemblies that form terminals.

Figure 11B:
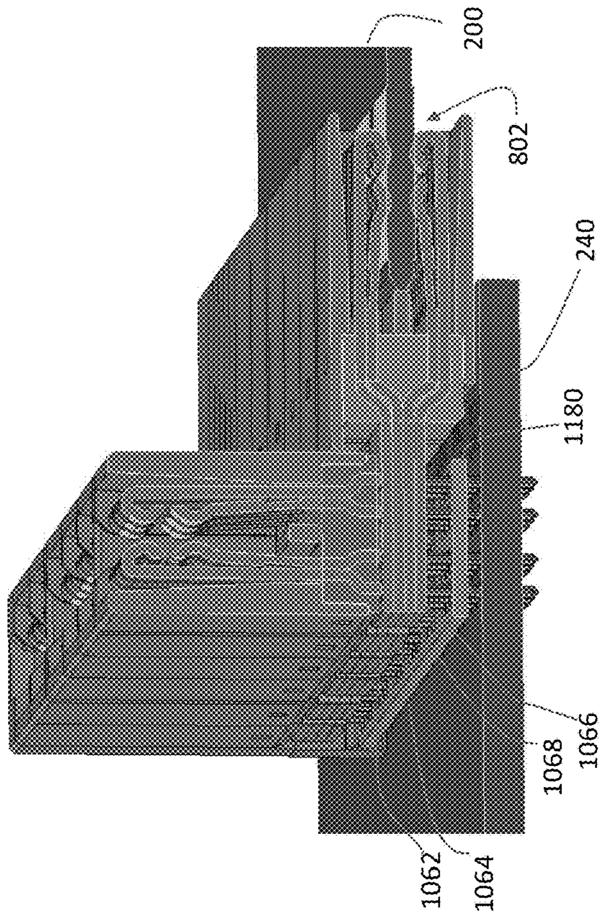
FIG. 11B is cross section of the card-edge connector of FIG. 10, mounted to a first PCB and mated with a second PCB, from the perspective indicated by line B-B in FIG. 11A.
Figure 11A:
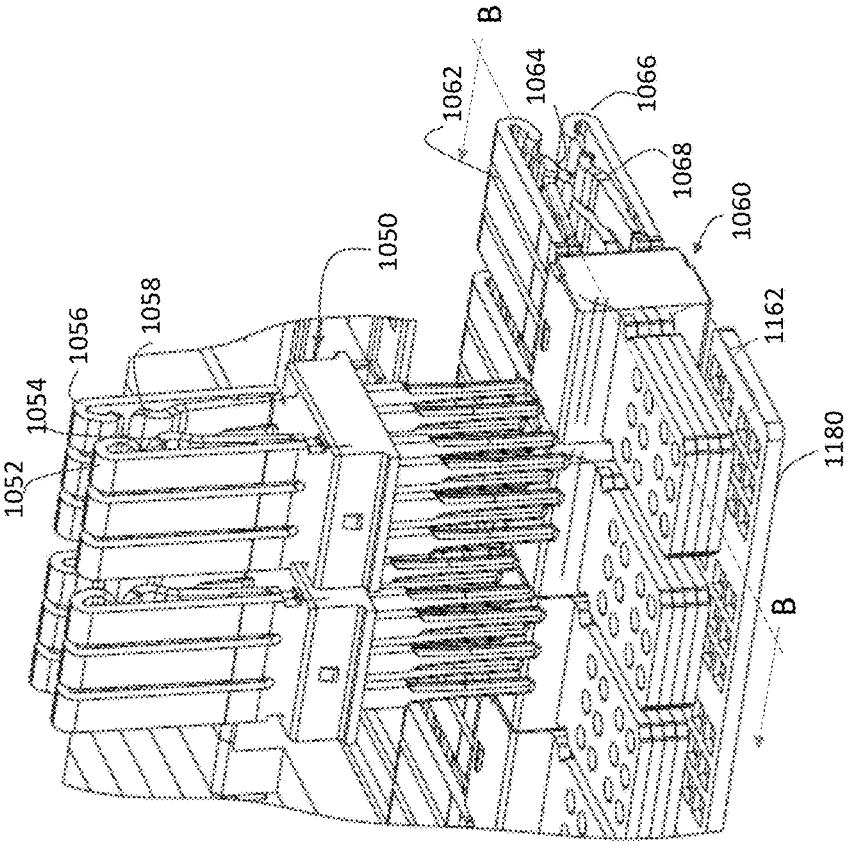
FIG. 11A is an enlarged view of the portion of the card-edge connector of FIG. 10 indicated by circle B.

FIG. 11A is an enlarged view of the portion of the card-edge connector of FIG. 10 indicated by circle B.

The conductors 1052, 1054, 1056 and 1058 of subassembly 1050 may have mating contact portions that are as described above for connector 700 and may similarly be held in a subassembly housing. The tails of conductors 1052, 1054, 1056 and 1058, however, may be configured to engage with conductors of subassembly 1060, which have a different configuration than conductors 862, 864, 866 and 868 of connector 700.

In this example, the conductors of subassembly 1060 on opposing sides of slot 802 are symmetrical. Conductors 1062 and 1066 have the same shape as each other, for example. Conductors 1064 and 1068 also have the same shape as each other. The conductors with the same shape are mounted on opposite sides of slot 802 such that they are symmetrical across the axis of insertion of PCB 200 into slot 802.

The symmetrical configuration results in the body portions of conductors 1068 and 1066 jogging toward the body portions of conductors 1062 and 1064. As a result, the body portions 1162 of conductors 1062, 1064, 1066 and 1068 are stacked, one on top of the other near the mounting interface 704, but at a further distance from the mounting interface 704 than in connector 700.

FIG. 11B is a cross section of the card-edge connector of FIG. 10, mounted to a first PCB and mated with a second PCB, from the perspective indicated by line B-B in FIG. 11A.

Figures 12A, 12B, 12C:
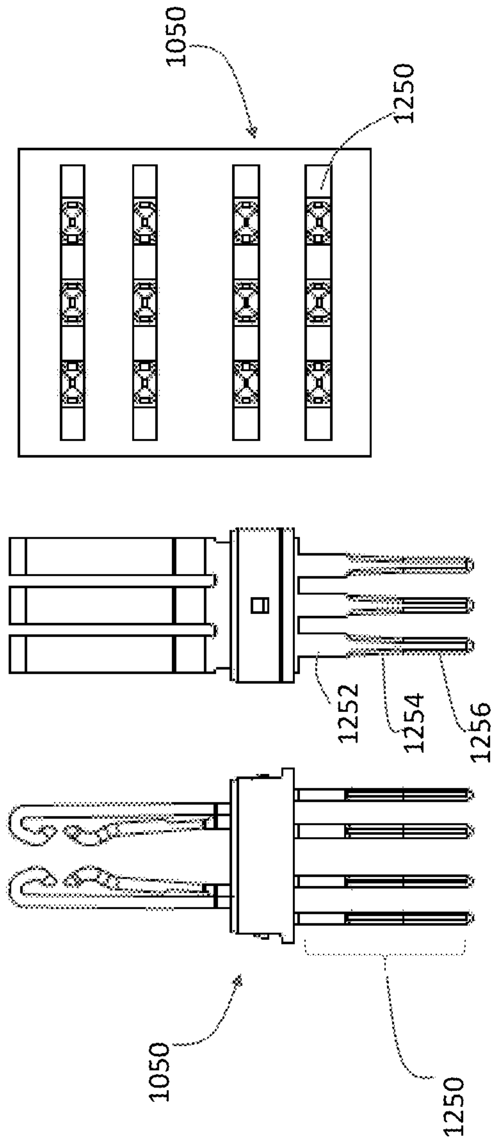
FIGS. 12A, 12B and 12C are a right side, back and bottom plan view of a terminal tap-off assembly of the card-edge connector of FIG. 10.

The tails of the conductors of subassembly 1050 are shaped to engage the body portions of conductors of subassembly 1060. As shown in FIGS. 12A, 12B, and 12C each of the conductors of subassembly 1050 has multiple tails 1250. As with the conductors of connector 700, each of the tails 1250 may have a distal portion 1256, shaped for attachment to a printed circuit board, and an engagement portion 1252, shaped to engage conductors in another subassembly. Additionally, each of the tails 1256 may include an intermediate portion 1254 between the engagement portion and the distal portion. Here, intermediate portion 1254 is shown to have a shape different than each of distal portion 1256 and engagement portion 1252. In other implementations, intermediate portion 1254 may have the same shape as either distal portion 1256 or engagement portion 1252.

Connector 1000 may include a tail organizer 1180 that has openings sized and positioned to receive the intermediate portions 1254 of one or more terminals. In this example, there is one organizer, here shown as a plate, for all of the terminals in the connector, but in other configurations, there may be multiple organizers. Conversely, the organizers collectively may not be coextensive with the tails of all of the terminals in connector 1000 such that the tails of some terminals may not pass through an opening of an organizer. Organizer 1180 may be made of an insulative material.

The openings in organizer 1180 may align the tails 1250 in a predetermined pattern matching the pattern of holes in organizer 1180. The pattern of holes in organizer 1180, for example, may match the pattern of holes in PCB 240 to which connector 1100 may be mounted and/or the pattern of holes in the body portions through which the tails 1250 pass. In some embodiments, connectors, such as connector 700, with asymmetrical conductors may additionally include an organizer. In other embodiments, the holes in body portions 762 may provide the function of an organizer.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Various changes may be made to the illustrative structures shown and described herein.

For example, construction techniques for forming connectors with power tap offs as described herein may be combined in embodiments not expressly illustrated. For example, the mating contact portions may have other configurations. For example, rather than conductors terminating in spring fingers, mating contact portions may be shaped as blades. Further, the number of conductors on each side of a slot may be varied. Moreover, conductors may be positioned on only one side of a slot forming a mating interface or the conductors on opposite sides of a slot may be electrically insulated from each other within the connector. Further, any of the configurations for which a bus bar is used as a conductive interconnect for a power tap off may alternatively or additionally be formed using a cable assembly as the conductive interconnect.

As another example of a possible variation, embodiments of an electronic system were described in which a printed circuit board 300 was designed to mate with a power supply unit through connector 310. In such a configuration, electrical power may be sourced from the power supply unit and used by components on printed circuit board 300. However, it should be appreciated that the techniques described herein are applicable to systems in which power flows in either direction through connector 310, and the techniques are useful with systems to couple power in any direction.

In some embodiments, one of the mating interfaces of the connector may be a card edge connector, which may be configured to receive a card edge, or similarly sized structure, from a power supply. In other embodiments, a mating interface of the connector may be configured for mating with a mating connector, which might, in turn, have a mounting interface for connection to a printed circuit board or other substrate.

A mating interface for power tap off may similarly be configured like a card edge connector, but may receive a busbar or similarly sized terminal of a power cable. In other embodiments, the power tap off mating interface may have terminals that mate with terminals in a connector terminating a power cable assembly.

As an example of another possible variation, power connectors in which conductors of two subassemblies engage by the conductors of a first subassembly, forming a power tap off interface, passing through conductors of a second subassembly, forming a mating interface. In other embodiments, the conductors of the second subassembly may pass through conductors of the first subassembly.

As a further example, terminal subassemblies were described in which bodies of multiple conductive members were aligned via features such as a notch and/or protrusion. In some examples, the alignment features may comprise one or more holes in one or more of the conductive members having a member, separate from the tails of the plurality of conductive members passing therethrough.

As yet another example, conductors with tails for pin in hole mounting are illustrated. Tails in other configurations, such as press fit or surface mount solder, for example, may alternatively or additionally be used.

As another example of a variation, the power portion 471 of a PCB may comprise a blade of conductive material. For example, the power portion 471 may comprise any of the following: a solid piece of elemental metal having high conductivity (e.g., Cu, Al); a solid piece of an alloy of metals (e.g., a Cu alloy); or a solid plate or core clad with a high-conductivity metal (e.g., a Cu plate clad with Au, a steel plate clad with Cu, a resin plate clad with Cu); or a laminate with layers of high conductivity material interspersed with lower conductivity materials.

Alternative construction techniques for bus bars may also be used. The busbar may be, for example: a solid piece of copper; a core that is clad with a thick layer of copper; a core that is clad with a thick layer of copper and a surface layer of gold; a core that is clad with a thick layer of copper, a layer of silver, and a surface layer of gold; a laminated structure with a thin insulative layer separating two thicker conductive layers; etc. As will be appreciated, the high-conductivity material may be a metal alloy. The core may be made of any material having properties that enable it to be formed into a blade-like shape and that may be clad with another material without adversely reacting with the other (cladding) material. For example, the core may be made of aluminum.

Moreover, a busbar with two portions supporting two electrically separate paths was illustrated to provide an exemplary busbar. Such a busbar may be used, for example, in an electronic device with one high current power circuit. Some electronic devices may have more than one high current power circuit, and may therefore have a busbar with more than two portions, such as 4, 6 or more portions. Each portion of the bus bar may have a mating portion, such as an exposed surface that may be inserted into a card edge connector as pictured above.

Manufacturing techniques may also be varied. For example, embodiments are described in which power conductive elements are formed into terminal subassemblies, which are then inserted into a connector housing. In some embodiments, power conductive elements may be separately inserted into a connector housing.

Connector manufacturing techniques were described using specific connector configurations as examples. A parallel board, right angle connector, that mates with a card edge was described as an example of a first connector. A second connector was illustrated as a vertical card edge connector. Either or both of these connectors may have other forms, including, for example, backplane connectors, cable connectors, stacking connectors, mezzanine connectors, I/O connectors, chip sockets, etc.

In some embodiments, contact tails were illustrated as posts suitable for a pin in holder solder attachment. However, other configurations may also be used, such as surface mount elements, press fits, etc., as aspects of the present disclosure are not limited to the use of any particular mechanism for attaching connectors to printed circuit boards.

As an example embodiment, a power connector may comprise a terminal, the terminal comprising: a first conductor comprising one or more tails; a second conductor comprising one or more openings; wherein: a cross sectional shape of the one or more tails and a shape of the one or more openings are different; and the one or more tails pass through and engage the one or more openings such that the first and second conductors are electrically coupled.

Non-limiting examples of a power connector include connector 700 shown in FIG. 7 and connector 1000 shown in FIG. 10.

Non-limiting examples of terminal(s) include terminal subassemblies 750 and 760 shown in FIG. 7 and subassemblies 1050 in FIGS. 10 and 1060 in FIG. 11A.

Figure 8A:
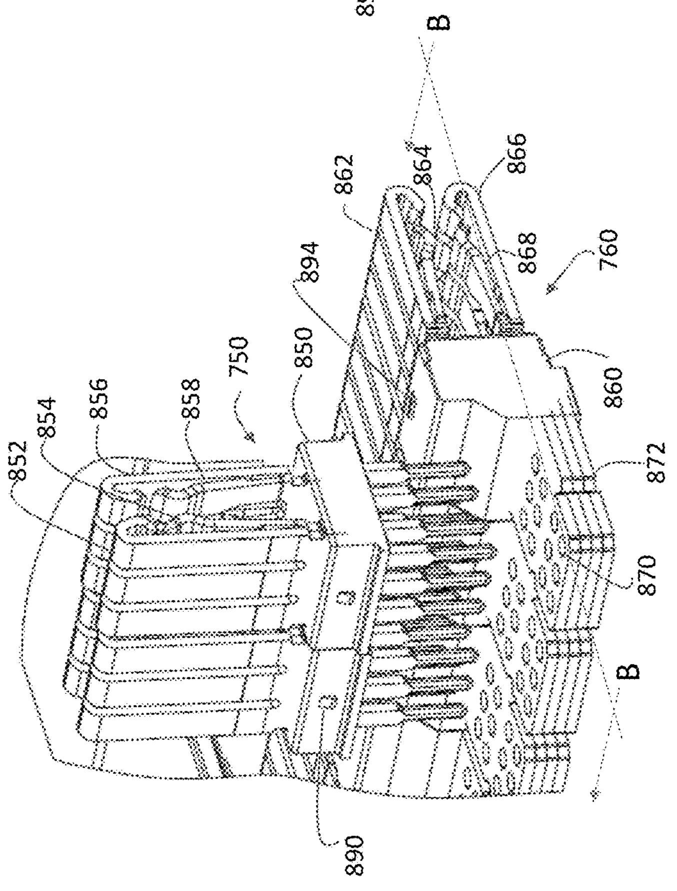
FIG. 8A is an enlarged view of the portion of the card-edge connector of FIG. 7 indicated by circle A.
Figure 9A:
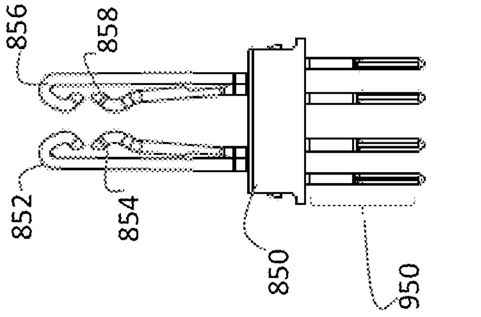

Non-limiting examples of a first conductor comprising one or more tails includes conductor 852 shown in FIG. 8A having contact tails 950 shown in FIG. 9C and conductor 1052 in FIG. 11A.

Non-limiting examples of a second conductor comprising one or more openings include conductor 862 shown in FIG. 8A having openings 870 and conductor 1062 shown in FIG. 11B.

Non-limiting examples of a cross sectional shape of the one or more tails and a shape of the one or more openings being different and/or achieving an interference fit includes the illustrated example of FIGS. 8A and 9C.

Non-limiting examples of the tails passing through and engaging the one or more openings or holes such that the first and second conductors, or conductive members, are electrically coupled or connected is shown in FIGS. 8B and 11B, thereby making an electrical connection.

Optionally, the first conductor may further comprise a first mating contact portion; the second conductor may further comprise a second mating contact portion; and the one or more tails, the first mating contact portion, and the second mating contact portion may be electrically connected. The cross sectional shape of the one or more tails may be rectangular and the cross sectional shape of the one or more openings may be circular. The one or more tails and the one or more openings may be sized to make an interference fit between each of the plurality of tails and a respective opening of the one or more openings. The terminal may further include a third conductor comprising one or more openings aligned with the one or more openings of the second conductor; and the one or more tails may pass through and engage the one or more openings of the third conductor such that the first, second and third conductors are electrically coupled. The second conductor may comprise a first alignment feature, and the third conductor may comprise a second alignment feature, aligned with the first alignment feature whereby the one or more openings of the third conductor are aligned with the one or more openings of the second conductor. The first alignment feature may be one of a protrusion and a notch, and the second alignment feature may be the other of the protrusion and the notch. The second conductor may comprise a first end, a second end, and an intermediate portion joining the first end and the second end; the second conductor may comprise a mating contact at the first end and the one or more openings of the second conductor may be disposed at the second end; and the intermediate portion of the second conductor may be jogged such that the first end and the second end of the second conductor are in different planes.

Non-limiting examples of a first and second mating contact portion includes mating contact portions shown in FIG. 7.

Non-limiting examples of a third conductor include conductor 866 and conductor 1066 (or conductor 868, etc.) which may comprise one or more openings aligned with the one or more openings of the second conductor 862 or conductor 1062 as shown in FIGS. 8B and 11B. Further, the one or more tails may pass through and engage the one or more openings of the third conductor such that the first, second and third conductors are electrically coupled as shown in FIGS. 8B and 11B.

Non-limiting examples of the alignment features include notches 872 shown in FIG. 8A.

Non-limiting examples of a portion of the second conductor 862 or conductor 1062 being jogged such that a first and second end of the second conductor are in different planes is shown in FIGS. 8B and 11B.

Optionally, the third conductor may comprise a first end, a second end, and an intermediate portion joining the first end and the second end; the third conductor may comprise a mating contact at the first end and the one or more openings of the second conductor may be disposed at the second end; the second end of the third conductor may be parallel and adjacent to the second end of the second conductor; and the intermediate portion of the third conductor may be straight. Alternatively or additionally, the third conductor may comprise a first end, a second end, and an intermediate portion joining the first end and the second end; the third conductor may comprise a mating contact at the first end and the one or more openings of the second conductor may be disposed at the second end; the second end of the third conductor may be parallel and adjacent to the second end of the second conductor; and the second conductor and the third conductor may be asymmetrical such that the second ends of the second and third conductors are closer to a distal end of the one or more tails of the first conductor than the first end of the second conductor. Alternatively or additionally, the third conductor may comprise a first end, a second end, and an intermediate portion joining the first end and the second end; the third conductor may comprise a mating contact at the first end and the one or more openings of the second conductor may be disposed at the second end; the second end of the third conductor may be parallel and adjacent to the second end of the second conductor; and the intermediate portion of the third conductor may be jogged such that the first end and the second end of the third conductor are in different planes. The second conductor and the third conductor may be symmetrical.

A non-limiting example of an intermediate portion of the third conductor, such as conductor 866, being straight is shown in FIG. 8B.

A non-limiting example of the second and third conductor being asymmetrical is shown in FIG. 8B in which second ends of the second and third conductors 862 and 868 are closer to a distal end of the one or more tails of the first conductor than a first end of the second conductor.

A non-limiting example of a portion of a conductor (e.g., a third conductor) being jogged such that a first and second end of the second conductor are in different planes is shown in FIG. 11B.

Optionally, the cross sectional shape of the one or more tails and the cross sectional shape of the one or more openings may be configured such that the one or more tails and the one or more openings hold the first and second conductors together via an interference fit. The first conductor may be orthogonal to the second conductor.

As an example embodiment, a power connector may comprise: a housing comprising a first slot, a second slot and a mounting face; a terminal comprising a first mating portion in the first slot, a second mating portion in the second slot and one or more tails extending through the mounting face, wherein: the terminal comprises: a first conductor comprising the one or more tails and a mating contact portion positioned in the first slot; and a second conductor comprising a mating contact portion positioned in the second slot and one or more openings; and each of the one or more tails passes through and electrically engages a respective opening of the one or more openings such that the first conductor and the second conductor are electrically connected.

Non-limiting examples of a housing include slot 710 and housing 740 with passages 742 and mounting interface 704 as shown in FIG. 7 and FIG. 10. A power tap off interface may include the slot and a mating interface may include the passage 742. The connector shown in FIG. 10 may be a card-edge connector and may include a card edge connector mating interface. Mating contact portions may be positioned in the slots or passages such as shown in FIGS. 8B and 11B. Slot 710 and passage 742 may be orthogonal as in FIGS. 8B and 11B, as non-limiting examples.

Optionally, the second slot may comprise a card edge connector mating interface. The first conductor may be one of a plurality of first conductors, each first conductor of the plurality of first conductors may comprise one or more tails and a mating contact portion positioned in the first slot; the second conductor may be one of a plurality of second conductors, each second conductor of the plurality of second conductors may comprise a mating contact portion positioned in the second slot and one or more openings; and the one or more tails of each of the plurality of first conductors may pass through and electrically engage a respective opening of the one or more openings in each of the plurality of second conductors such that the plurality of first conductors and the plurality of second conductors are electrically connected. The plurality of second conductors may comprise alignment features that engage with one another to align the at least one opening in each of the plurality of second conductors. The alignment features may comprise protrusions and indents. The one or more tails and the one or more openings may be configured to fit together via an interference fit. The first slot may be orthogonal to the second slot.

As an example embodiment, an electrical connector may comprise a mating interface, a power tap off interface and a mounting interface, the electrical connector comprising a plurality of terminals, each of the plurality of terminals comprising: a first terminal subassembly comprising a plurality of first conductive members, each of the plurality of first conductive members comprising a mating interface portion disposed at the power tap off interface and tails configured for mounting to a substrate disposed at the mounting interface; a second terminal subassembly comprising a plurality of second conductive members, each of the plurality of second conductive members comprising a mating interface portion at the mating interface and a body portion comprising a plurality of holes; wherein: the tails of the plurality of first conductive members pass through respective holes of the plurality of second conductive members, making an electrical connection between the plurality of first conductive members and the plurality of second conductive members.

As a non-limiting example, a body portion 1162 of a conductive member may include the openings or holes as shown in FIG. 11A.

A non-limiting example of the body portions of the conductive members being jogged or being straight is shown in FIG. 8B and FIG. 11B.

Optionally, the body portions of the plurality of second conductive members may be stacked side-by-side in parallel. The mating interface may comprise a slot comprising an entry, and for a first subset of the plurality of second conductive members, the mating interface portion may be a first distance from the entry and for a second subset of the plurality of second conductive members, the mating interface portion may be a second distance from the entry, the first distance being less than the second distance. For a third subset of the plurality of second conductive members, the mating interface portion may be on a first side of the slot and for a fourth subset of the plurality of second conductive members, the mating interface portion may be on a second side of the slot, opposite the first side. Alternatively or additionally, conductive members of the third subset of the plurality of second conductive members may be symmetrical with respect to conductive members of the fourth subset of the plurality of second conductive members. Alternatively or additionally, conductive members of the third subset of the plurality of second conductive members may be asymmetrical with respect to conductive members of the fourth subset of the plurality of second conductive members. The body portions of the conductive members of the third subset of the plurality of second conductive members may jog towards the mounting interface. Alternatively or additionally, the body portions of the conductive members of the fourth subset of the plurality of second conductive members may be straight.

FIGS. 11A and 11B show a non-limiting example of the first subset of conductive members, such as including conductor 1062, being a lesser distance from an entry of a slot than the second subset of conductive members such as including conductor 1068.

A non-limiting example of the third subset of conductive members may include conductor 1064 and the fourth subset of conductive members may include conductor 1068, shown in FIG. 11B. These subsets may be symmetrical, as shown in FIG. 11B or asymmetrical, as shown in FIG. 8B.

Optionally, the power tap off interface may comprise a second slot comprising a second entry, and for a first subset of the plurality of first conductive members, the mating interface portion may be a third distance from the second entry and for a second subset of the plurality of first conductive members, the mating interface portion may be a fourth distance from the second entry, the third distance being less than the fourth distance. For a third subset of the plurality of first conductive members, the mating interface portion may be on a first side of the second slot and for a fourth subset of the plurality of first conductive members, the mating interface portion may be on a second side of the second slot, opposite the first side.

A non-limiting example of the mating interface portions of conductor 858 and conductor 856 being different distances from an entry slot of a power tap off interface is shown in FIGS. 7 and 8A. As shown in FIGS. 7 and 8A, a subset of conductive members may have a mating interface on a first side of the aforementioned slot, including conductor 852, and another subset may have a mating interface portion on an opposite side, including conductor 856, as a non-limiting example.

Optionally, for each of the plurality of terminals, an insulative member may be molded over the plurality of first conductive members. For each of the plurality of terminals, an insulative member may be molded over the plurality of second conductive members. The electrical connector may further comprise an insulative housing, the insulative housing comprising: a first portion comprising a first slot, wherein the power tap off interface comprises the first slot; and a second portion comprising a second slot, wherein the mating interface comprises the second slot. The electrical connector may further comprise an insulative plate at the mounting interface, the insulative plate comprising a plurality of holes therethrough, wherein the tails of the plurality of first conductive members for a plurality of terminals extend through the holes. For each of the plurality of terminals, each of the plurality of second conductive members may comprise a registration feature, the registration feature comprising a hole having a member, separate from the tails of the plurality of conductive members passing therethrough. Alternatively or additionally, for each of the plurality of terminals, each of the plurality of second conductive members may comprise a registration feature, the registration feature comprising a notch along an edge of the second conductive member.

A non limiting example of the insulative member such as insulative member 850 may be molded over conductive members, as shown in FIG. 8A.

A non-limiting example of an insulative plate, such as organizer 1180 may be at the mounting interface, as shown in FIGS. 11A and 11B.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Terms such as "horizontal" and "vertical" were used to distinguish interfaces of an L-shaped connector. Horizontal and vertical directions may be determined relative to a surface of a printed circuit board to which the connector is mounted or, when the connector is not mounted to the board, the plane that a printed circuit board would occupy. However, such terms indicate relative direction and the horizontal and/or vertical directions may be determined relative to other reference planes.

The present disclosure is not limited to the details of construction or the arrangements of components set forth in the foregoing description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. A power connector comprising a terminal, the terminal comprising:
- a first conductor comprising one or more tails; and
- a second conductor comprising one or more openings;
- wherein:
  - a cross sectional shape of the one or more tails and a shape of the one or more openings are different;
  - the terminal comprises a third conductor comprising one or more openings aligned with the one or more openings of the second conductor; and
  - the one or more tails pass through and engage the one or more openings of the second and third conductors such that the first, second and third conductors are electrically coupled.

2. The power connector of claim 1, wherein:
- the first conductor further comprises a first mating contact portion;
- the second conductor further comprises a second mating contact portion; and
- the one or more tails, the first mating contact portion, and the second mating contact portion are electrically connected.

3. The power connector of claim 2, wherein:

the cross sectional shape of the one or more tails is rectangular and the cross sectional shape of the one or more openings is circular; and the one or more tails and the one or more openings are sized to make an interference fit between each of the one or more tails and a respective opening of the one or more openings.

4. The power connector of claim 1, wherein the second conductor comprises a first alignment feature, and the third conductor comprises a second alignment feature, aligned with the first alignment feature whereby the one or more openings of the third conductor are aligned with the one or more openings of the second conductor.

5. The power connector of claim 4, wherein the first alignment feature includes a notch.

6. The power connector of claim 1, wherein:

the second conductor comprises a first end, a second end, and an intermediate portion joining the first end and the second end;

the second conductor comprises a mating contact at the first end and the one or more openings of the second conductor are disposed at the second end; and the intermediate portion of the second conductor is jogged such that the first end and the second end of the second conductor are in different planes.

7. The power connector of claim 6, wherein:

the third conductor comprises a first end, a second end, and an intermediate portion joining the first end and the second end;

the third conductor comprises a mating contact at the first end and the one or more openings of the second conductor are disposed at the second end;

the second end of the third conductor is parallel and adjacent to the second end of the second conductor; and the intermediate portion of the third conductor is straight.

8. The power connector of claim 6, wherein:

the third conductor comprises a first end, a second end, and an intermediate portion joining the first end and the second end;

the third conductor comprises a mating contact at the first end and the one or more openings of the second conductor are disposed at the second end;

the second end of the third conductor is parallel and adjacent to the second end of the second conductor; and the second conductor and the third conductor are asymmetrical such that the second ends of the second and third conductors are closer to a distal end of the one or more tails of the first conductor than the first end of the second conductor.

9. The power connector of claim 6, wherein:

the third conductor comprises a first end, a second end, and an intermediate portion joining the first end and the second end;

the third conductor comprises a mating contact at the first end and the one or more openings of the second conductor are disposed at the second end;

the second end of the third conductor is parallel and adjacent to the second end of the second conductor; and the intermediate portion of the third conductor is jogged such that the first end and the second end of the third conductor are in different planes.

10. The power connector of claim 1, wherein the cross sectional shape of the one or more tails and the cross sectional shape of the one or more openings are configured such that the one or more tails and the one or more openings hold the first and second conductors together via an interference fit.

11. A power connector, the power connector comprising:

a housing comprising a first slot, a second slot and a mounting face;

a terminal comprising a first mating portion in the first slot, a second mating portion in the second slot and one or more tails extending through the mounting face, wherein:

the terminal comprises:

a first conductor comprising the one or more tails and a mating contact portion positioned in the first slot; and a second conductor comprising a mating contact portion positioned in the second slot and one or more openings; and each of the one or more tails passes through and electrically engages a respective opening of the one or more openings such that the first conductor and the second conductor are electrically connected.

12. The power connector of claim 11, wherein the second slot comprises a card edge connector mating interface.

13. The power connector of claim 11, wherein:

the first conductor is one of a plurality of first conductors, each first conductor of the plurality of first conductors comprises one or more tails and a mating contact portion positioned in the first slot;

the second conductor is one of a plurality of second conductors, each second conductor of the plurality of second conductors comprises a mating contact portion positioned in the second slot and one or more openings; and the one or more tails of each of the plurality of first conductors passes through and electrically engages a respective opening of the one or more openings in each of the plurality of second conductors such that the plurality of first conductors and the plurality of second conductors are electrically connected.

14. The power connector of claim 13, wherein the plurality of second conductors comprise alignment features that engage with one another to align the one or more openings in each of the plurality of second conductors.

15. The power connector of claim 11, wherein the one or more tails and the one or more openings are configured to fit together via an interference fit.

16. The power connector of claim 11, wherein the first slot is orthogonal to the second slot.

17. An electrical connector comprising a mating interface, a power tap off interface and a mounting interface, the electrical connector comprising a plurality of terminals, each of the plurality of terminals comprising:

a first terminal subassembly comprising a plurality of first conductive members, each of the plurality of first conductive members comprising a mating interface portion disposed at the power tap off interface and tails configured for mounting to a substrate disposed at the mounting interface; and a second terminal subassembly comprising a plurality of second conductive members, each of the plurality of second conductive members comprising a mating interface portion at the mating interface and a body portion comprising a plurality of holes;

wherein:

the tails of the plurality of first conductive members pass through respective holes of the plurality of second conductive members, making an electrical connection between the plurality of first conductive members and the plurality of second conductive members.

18. The electrical connector of claim 17, wherein:

the mating interface comprises a slot comprising an entry, and for a first subset of the plurality of second conductive members, the mating interface portion is a first distance from the entry and for a second subset of the plurality of second conductive members, the mating interface portion is a second distance from the entry, the first distance being less than the second distance.

19. The electrical connector of claim 18, wherein:

for a third subset of the plurality of second conductive members, the mating interface portion is on a first side of the slot and for a fourth subset of the plurality of second conductive members, the mating interface portion is on a second side of the slot, opposite the first side.

20. The electrical connector of claim 19, wherein:

conductive members of the third subset of the plurality of second conductive members are symmetrical with respect to conductive members of the fourth subset of the plurality of second conductive members.

21. The electrical connector of claim 19, wherein:

conductive members of the third subset of the plurality of second conductive members are asymmetrical with respect to conductive members of the fourth subset of the plurality of second conductive members.

22. The electrical connector of claim 19, wherein:

the body portions of the conductive members of the third subset of the plurality of second conductive members jog towards the mounting interface.

23. The electrical connector of claim 22, wherein:

the body portions of the conductive members of the fourth subset of the plurality of second conductive members are straight.

24. The electrical connector of claim 19, wherein:

the power tap off interface comprises a second slot comprising a second entry, and for a first subset of the plurality of first conductive members, the mating interface portion is a third distance from the second entry and for a second subset of the plurality of first conductive members, the mating interface portion is a fourth distance from the second entry, the third distance being less than the fourth distance.

25. The electrical connector of claim 24, wherein:

for a third subset of the plurality of first conductive members, the mating interface portion is on a first side of the second slot and for a fourth subset of the plurality of first conductive members, the mating interface portion is on a second side of the second slot, opposite the first side.

26. The electrical connector of claim 17, further comprising:

for each of the plurality of terminals, an insulative member molded over the plurality of first conductive members.

27. The electrical connector of claim 17, further comprising:

an insulative housing, the insulative housing comprising:

a first portion comprising a first slot, wherein the power tap off interface comprises the first slot; and a second portion comprising a second slot, wherein the mating interface comprises the second slot.

28. The electrical connector of claim 27, further comprising:

an insulative plate at the mounting interface, the insulative plate comprising a plurality of holes therethrough, wherein the tails of the plurality of first conductive members for a plurality of terminals extend through the holes.

29. The electrical connector of claim 27, wherein:

for each of the plurality of terminals, each of the plurality of second conductive members comprises a registration feature, the registration feature comprising a hole having a member, separate from the tails of the plurality of conductive members passing therethrough.

* * * * *